(12) United States Patent
Hyun et al.

(10) Patent No.: US 12,504,569 B2
(45) Date of Patent: Dec. 23, 2025

(54) REFLECTIVE COLOR PIXEL BASED ON LOSSY METAL

(71) Applicant: EWHA UNIVERSITY-INDUSTRY COLLABORATION FOUNDATION, Seoul (KR)

(72) Inventors: Jerome Kartham Hyun, Seoul (KR); Youngji Kim, Seoul (KR); Kyungmin Jung, Seoul (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 669 days.

(21) Appl. No.: 17/682,560

(22) Filed: Feb. 28, 2022

(65) Prior Publication Data

US 2022/0179142 A1  Jun. 9, 2022

Related U.S. Application Data

(63) Continuation of application No. PCT/KR2020/011535, filed on Aug. 28, 2020.

(30) Foreign Application Priority Data

Aug. 29, 2019  (KR) .................. 10-2019-0106717

(51) Int. Cl.
*G02B 5/28*  (2006.01)
*G02B 5/30*  (2006.01)

(52) U.S. Cl.
CPC ........... *G02B 5/286* (2013.01); *G02B 5/3033* (2013.01)

(58) Field of Classification Search
CPC .................... G02B 5/286; G02B 5/3033

USPC ........................................ 351/891
See application file for complete search history.

(56) References Cited

U.S. PATENT DOCUMENTS

| | | | | |
|---|---|---|---|---|
| 5,422,756 A * | 6/1995 | Weber | ............... | G02F 1/133536 |
| | | | | 359/494.01 |
| 2005/0134769 A1* | 6/2005 | Mi | ............... | G02F 1/13362 |
| | | | | 349/114 |
| 2010/0220377 A1* | 9/2010 | Yamada | ............ | H01L 27/14621 |
| | | | | 359/241 |
| 2010/0328587 A1* | 12/2010 | Yamada | ............... | G02B 5/1809 |
| | | | | 349/106 |
| 2014/0332077 A1* | 11/2014 | Crouse | .................. | G02B 5/3058 |
| | | | | 359/484.01 |
| 2016/0231481 A1* | 8/2016 | Boman | .................. | G02B 5/206 |

FOREIGN PATENT DOCUMENTS

| | | |
|---|---|---|
| CN | 206057627 U | 3/2017 |
| JP | 2007-333826 A | 12/2007 |
| JP | 2018-132728 A | 8/2018 |
| KR | 10-2010-0032447 A | 3/2010 |
| KR | 10-2013-0140302 A | 2/2013 |

(Continued)

OTHER PUBLICATIONS

KR-20180087478-A—English translation—Korea—Aug. 2, 2018.*

(Continued)

*Primary Examiner* — Sharrief I Broome
(74) *Attorney, Agent, or Firm* — GREENBERG TRAURIG, LLP

(57) ABSTRACT

The present disclosure relates to a reflective color pixel including a dielectric grating formed on a lossy metal substrate.

6 Claims, 44 Drawing Sheets

(56) References Cited

FOREIGN PATENT DOCUMENTS

| | | | |
|---|---|---|---|
| KR | 10-1691956 B1 | 1/2017 | |
| KR | 10-2018-0087478 A | 8/2018 | |
| KR | 20180087478 A * | 8/2018 | ............... G02B 5/22 |
| KR | 10-2019-0053570 A | 5/2019 | |
| KR | 10-2019-0099963 A | 8/2019 | |

OTHER PUBLICATIONS

International Search Report, issued by the ISA/KR Korean Intellectual Property Office, regarding corresponding patent application Serial No. PCT/KR2020/011535; dated Dec. 2, 2020; 2 pages (English Translation).

* cited by examiner a) metal film evaporation  b) PMMA spin coating c) e-beam lithography d) development

FIG. 2D(ii)

FIG. 2D(iii)
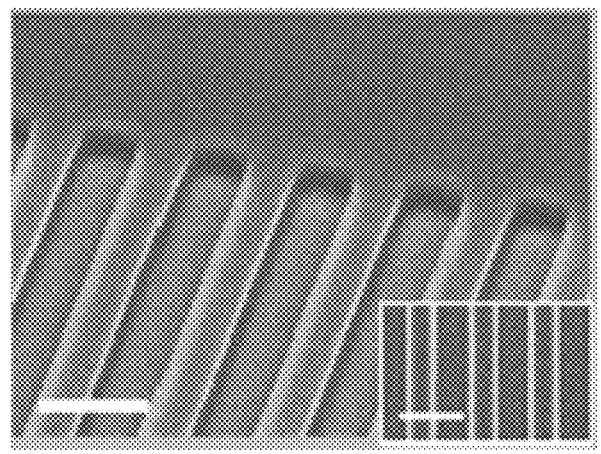
FIG. 3
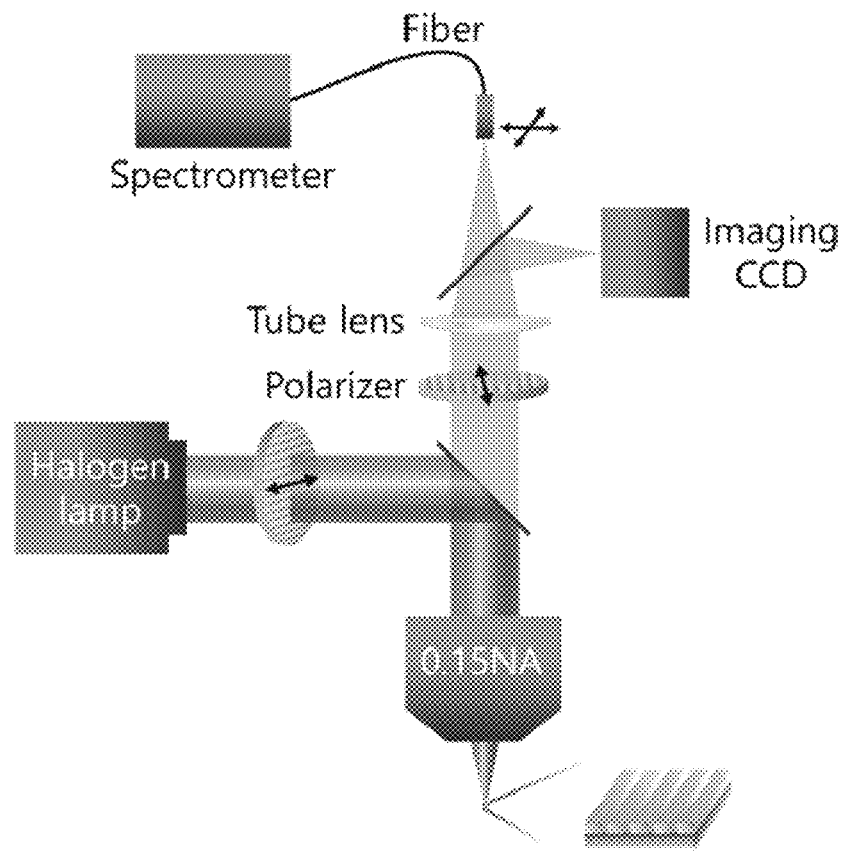

*FIG. 4C(ii)*
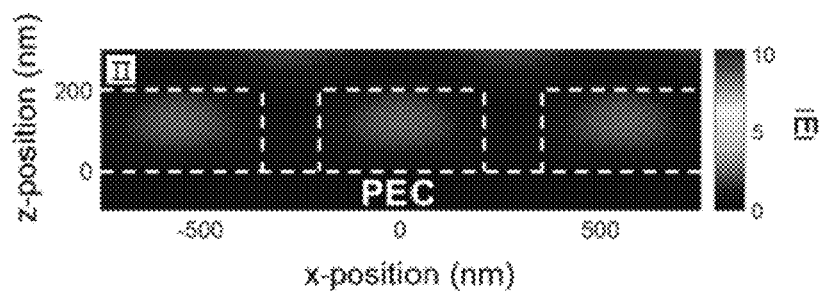
*FIG. 4C(iii)*
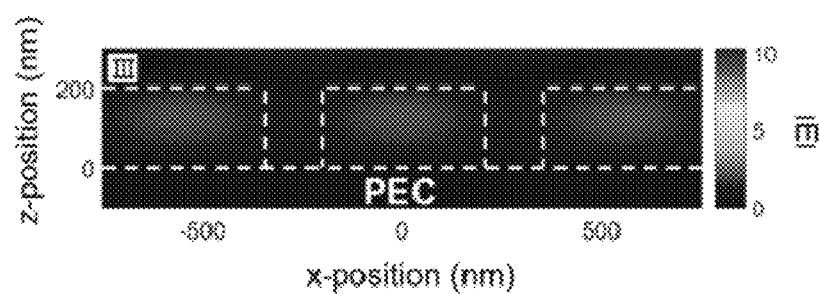
*FIG. 4D(i)*
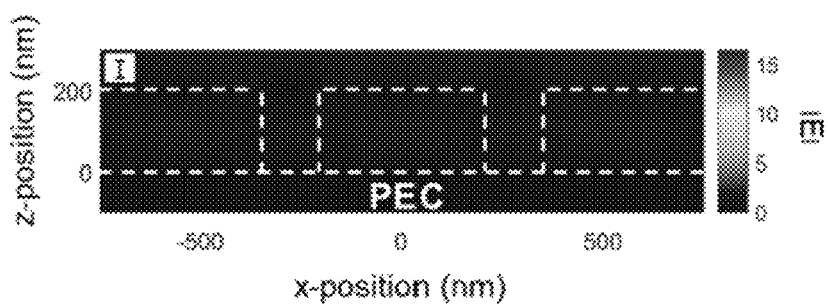

*FIG. 4D(ii)*
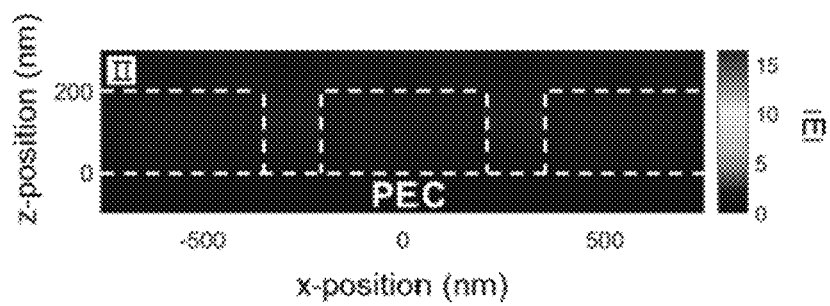
*FIG. 4D(iii)*
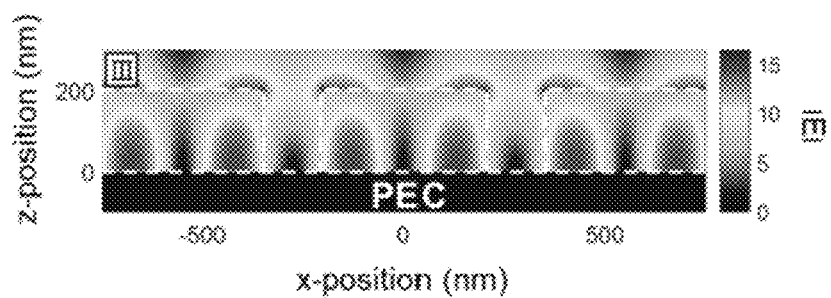
*FIG. 4E(i)*
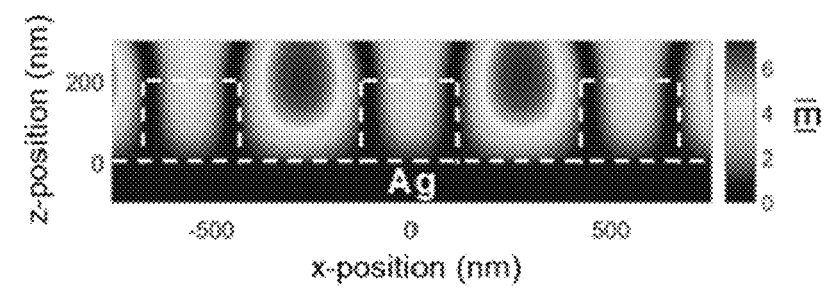

*FIG. 4E(ii)*
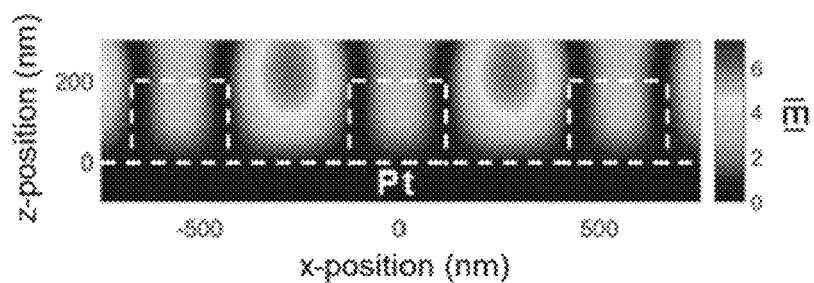
*FIG. 4E(iii)*
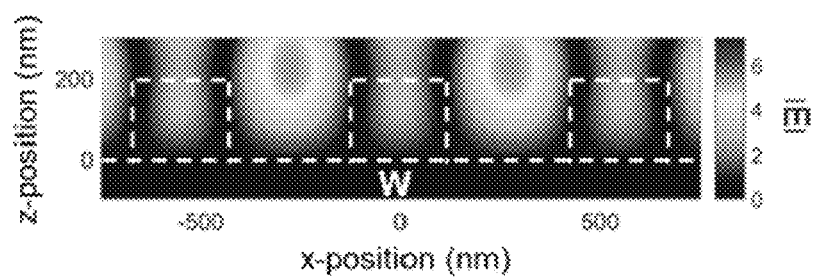
*FIG. 4F(i)*
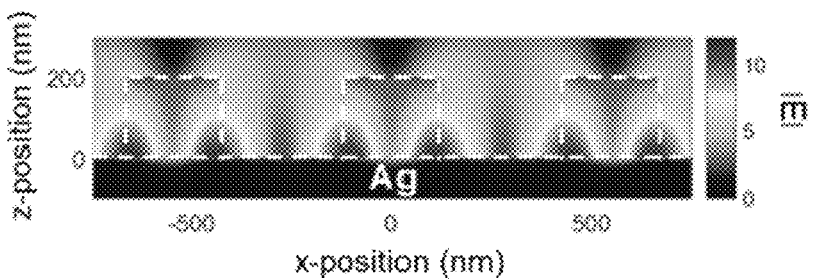

*FIG. 4F(ii)*
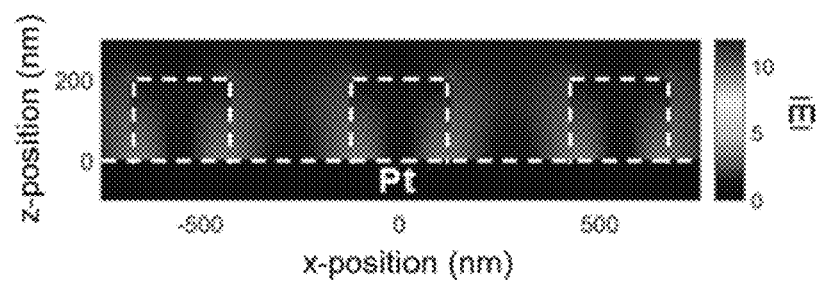
*FIG. 4F(iii)*
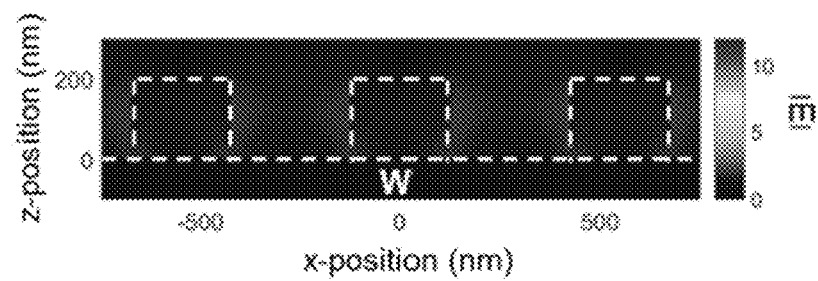

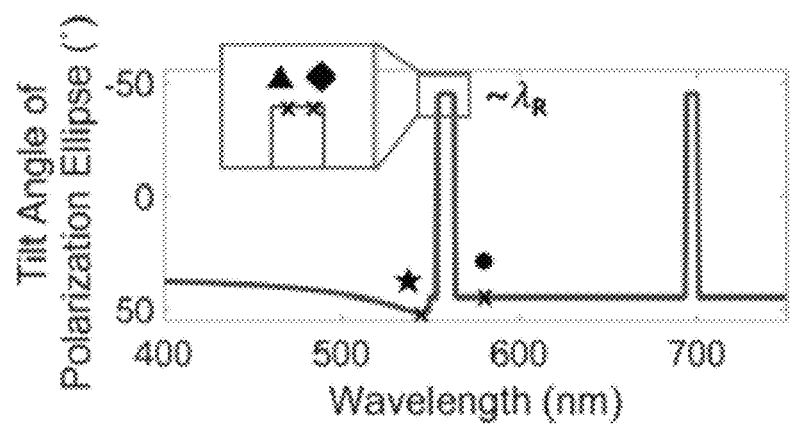
FIG. 5G(ii)

FIG. 5H(ii)
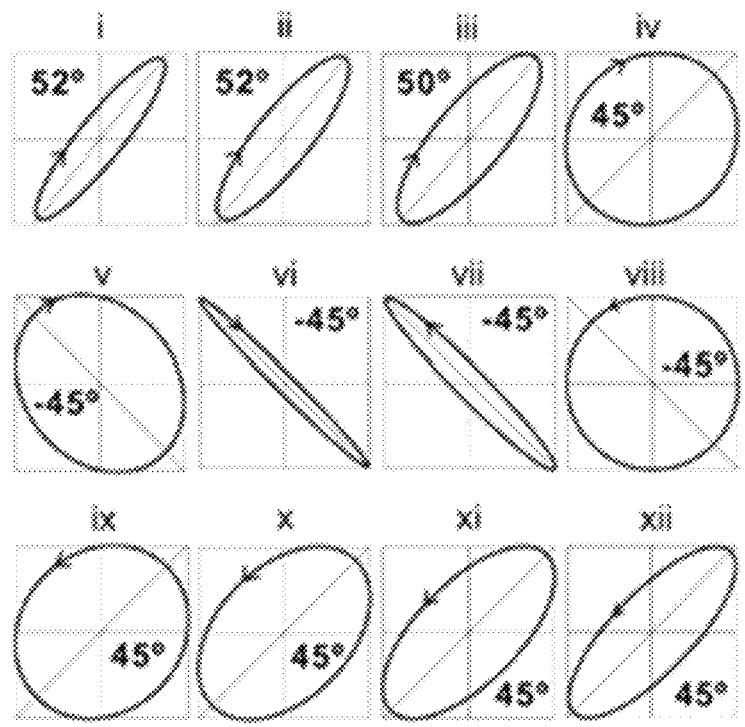

*FIG. 5H(iii)*
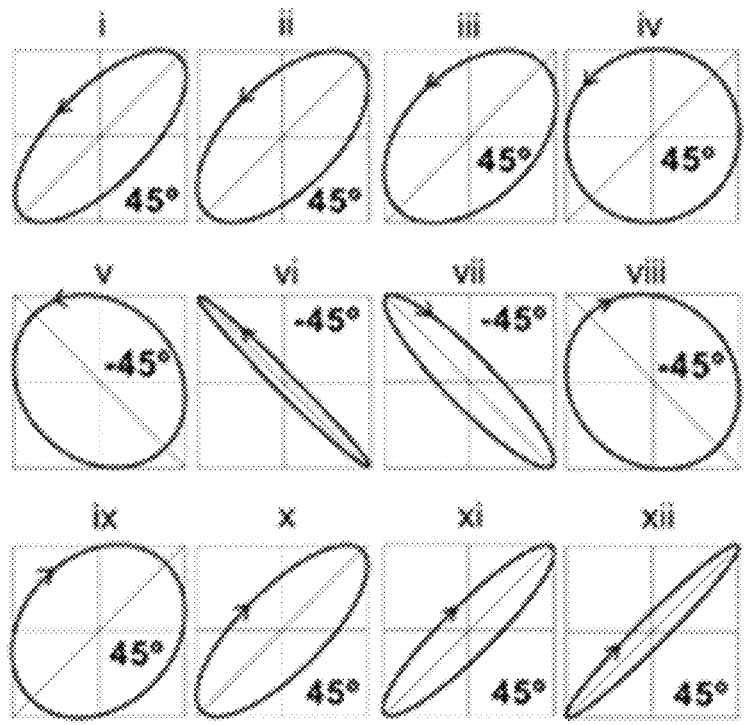
*FIG. 6A*
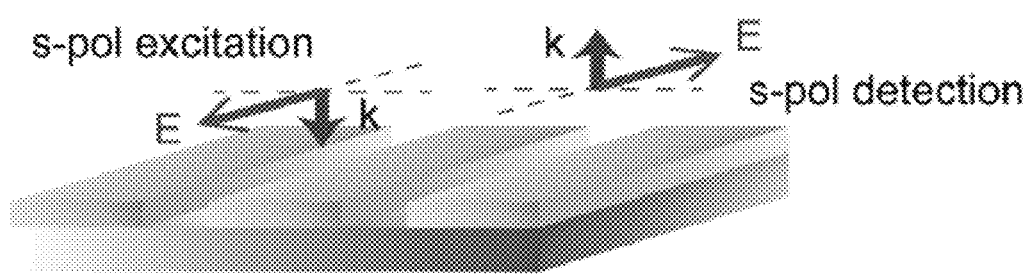

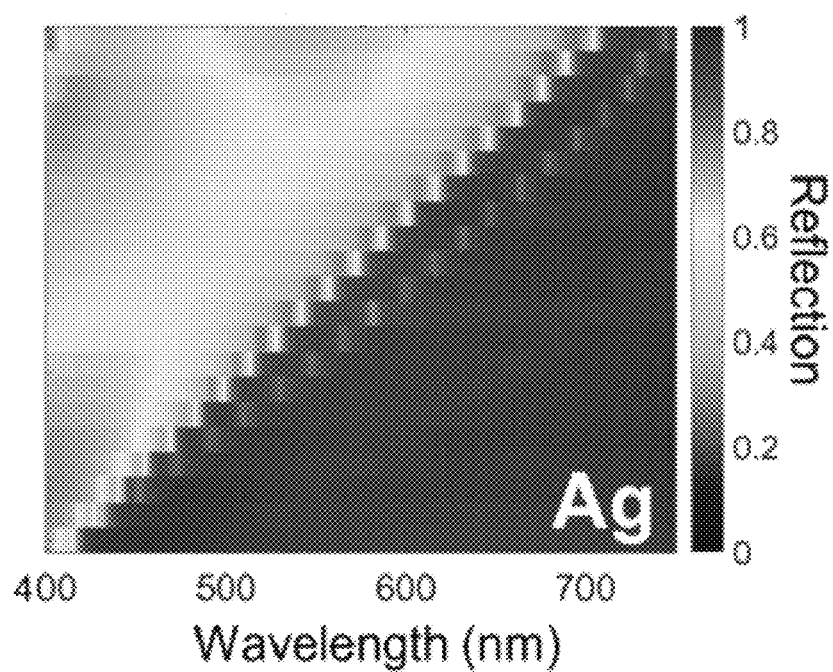
FIG. 6C(ii)

*FIG. 6C(iii)*
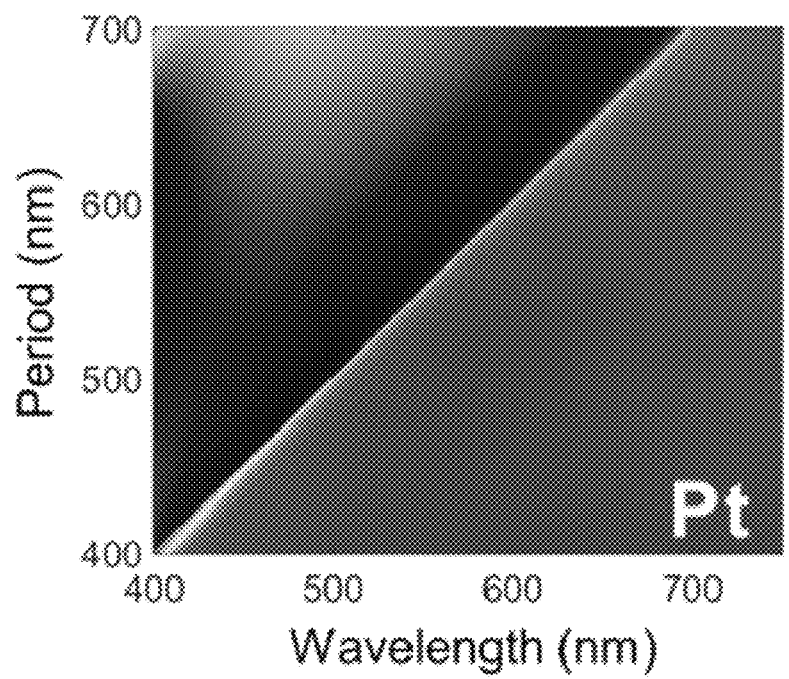
*FIG. 6C(iv)*
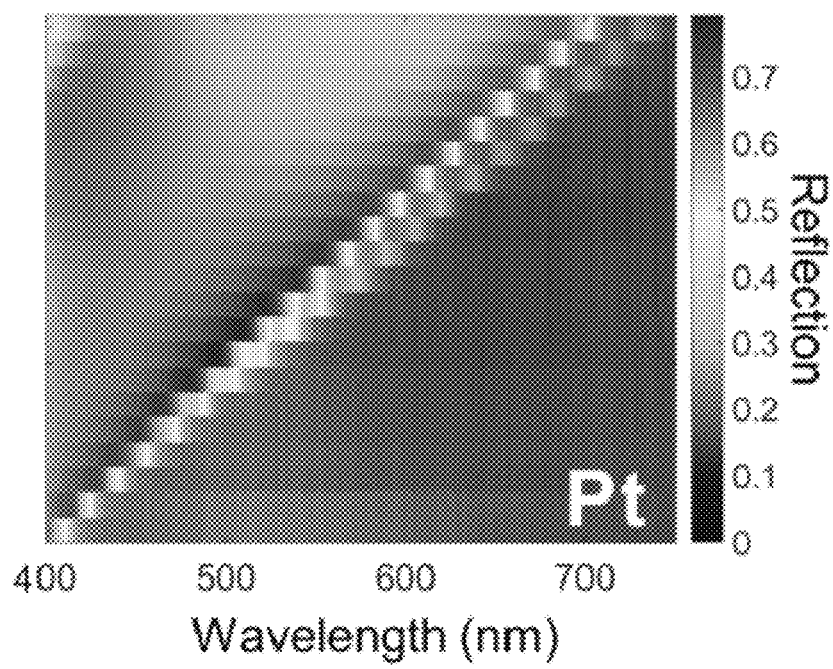

*FIG. 6C(vi)*

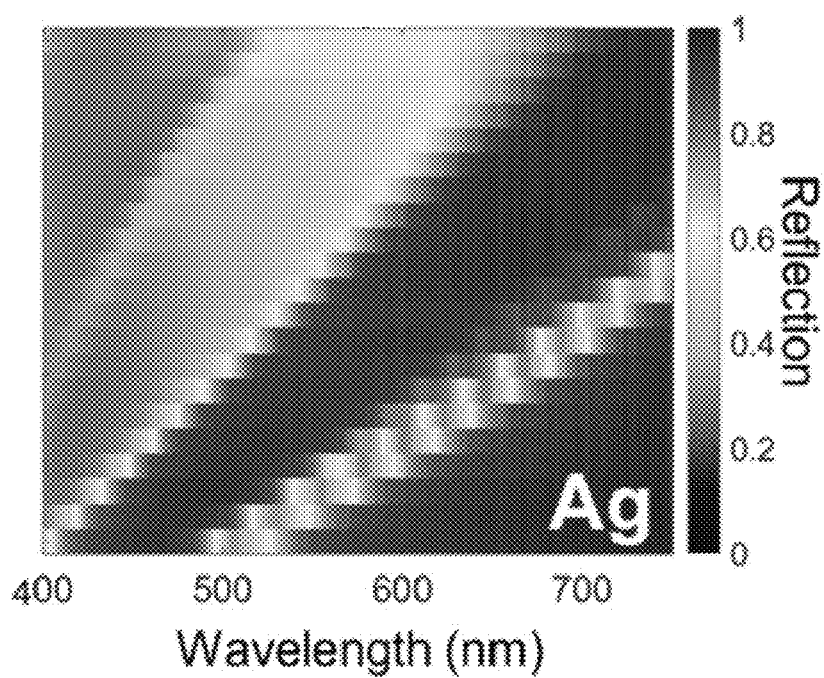
FIG. 6D(ii)

FIG. 6D(iii)
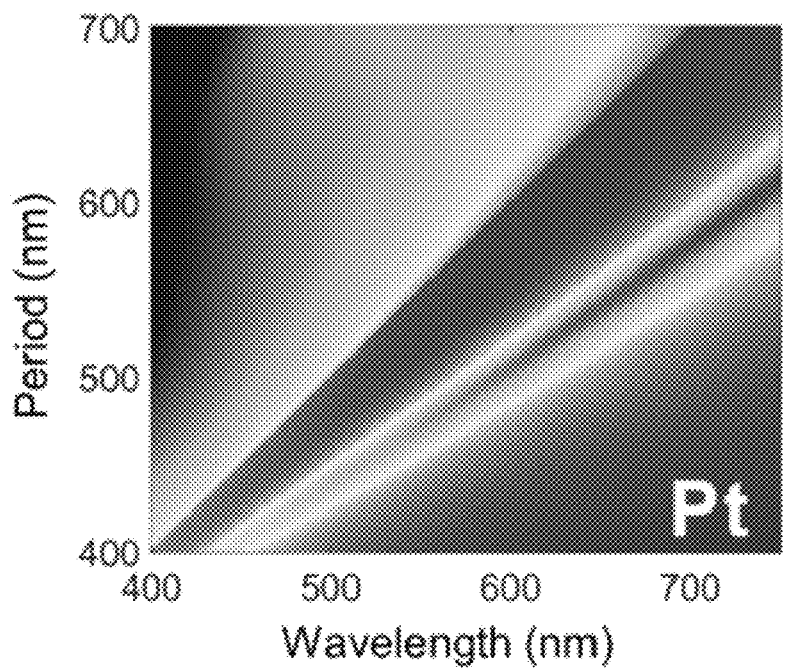
FIG. 6D(iv)
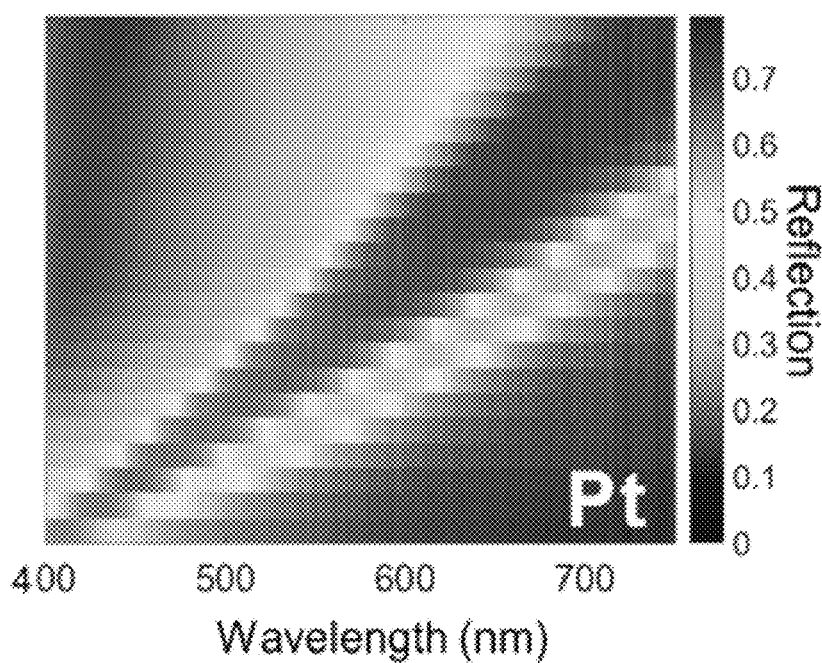

FIG. 7A(iii)
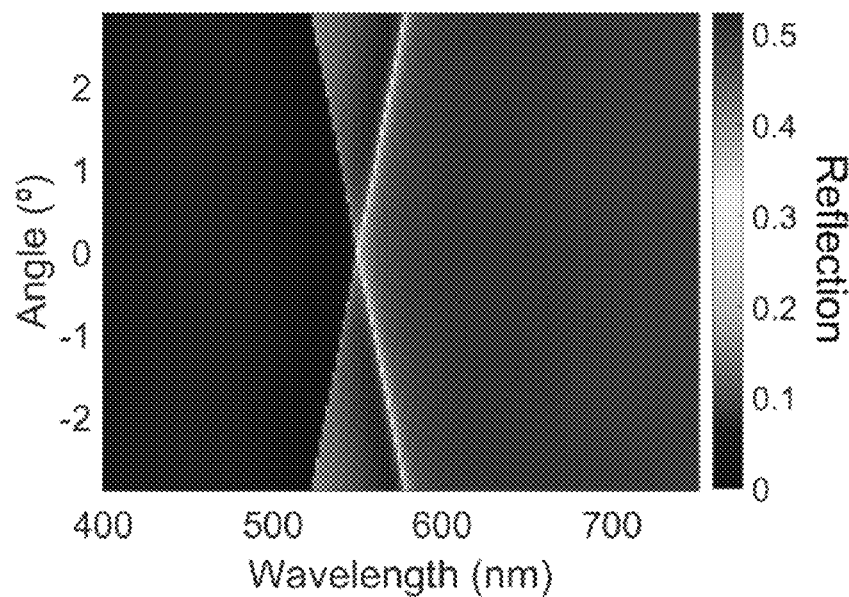
FIG. 7B(i)
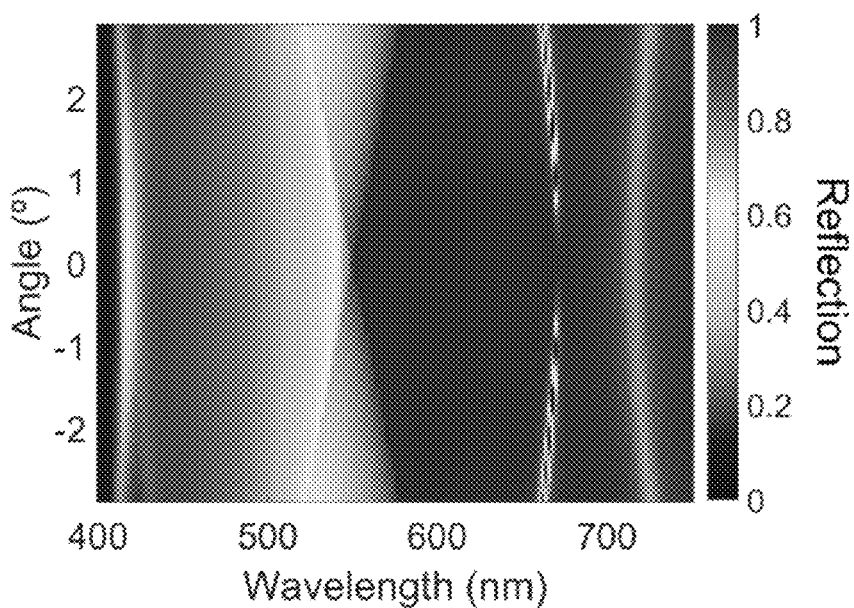

*FIG. 7B(ii)*
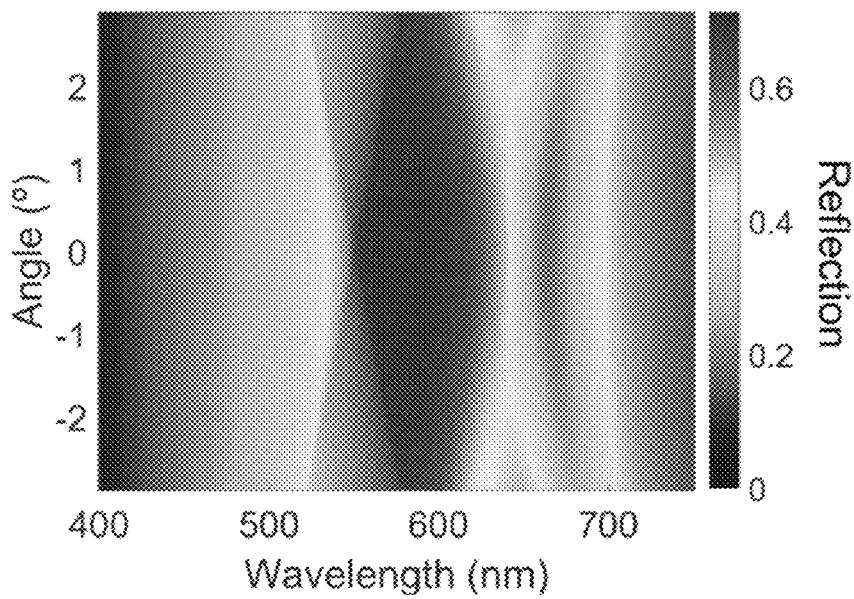
*FIG. 7B(iii)*
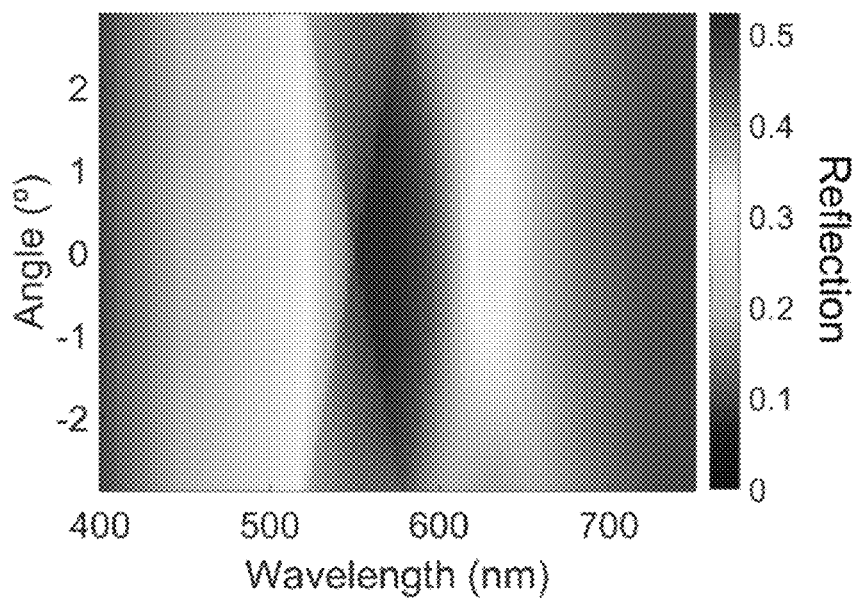

FIG. 8A(ii)

FIG. 8A(iii)
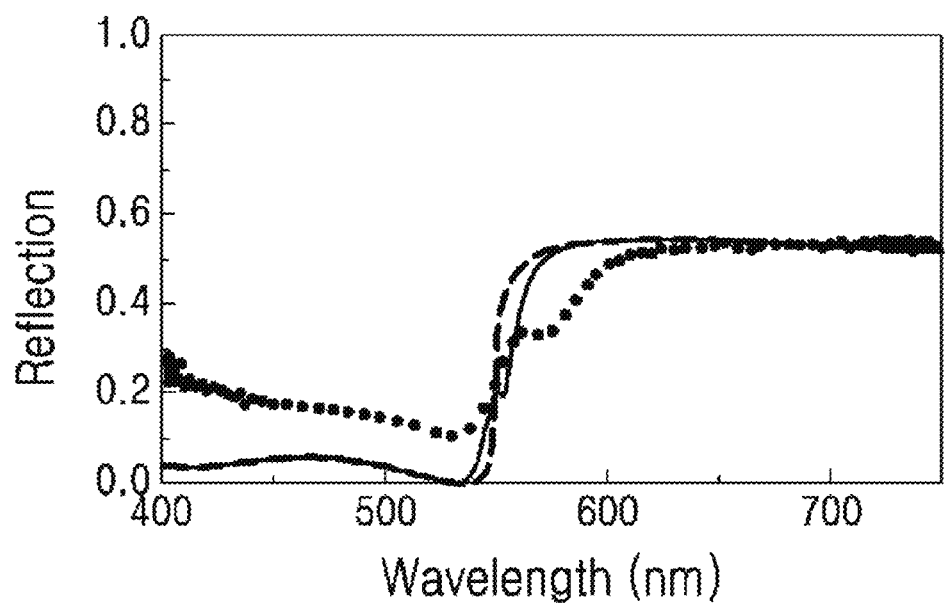
FIG. 8B(i)
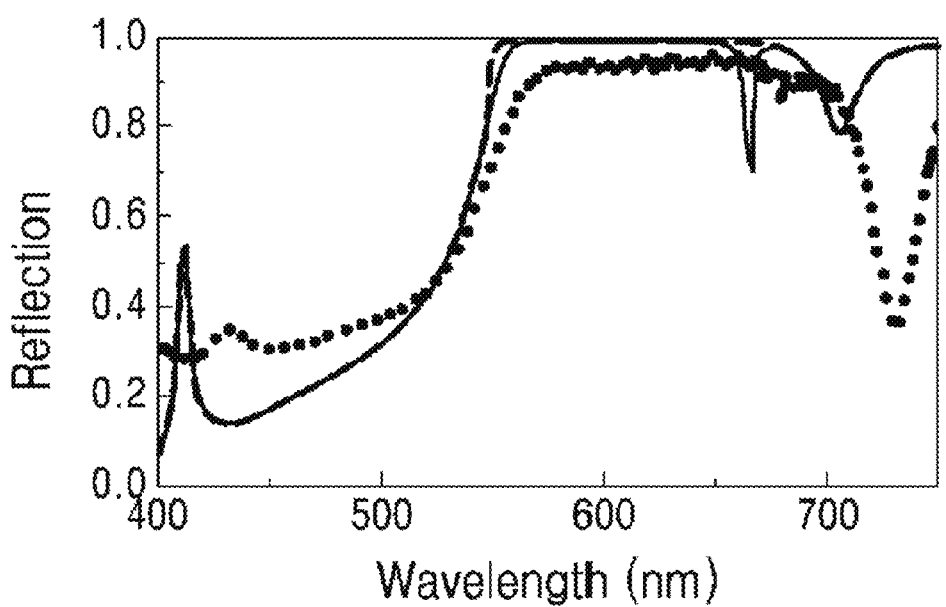

FIG. 8B(ii)
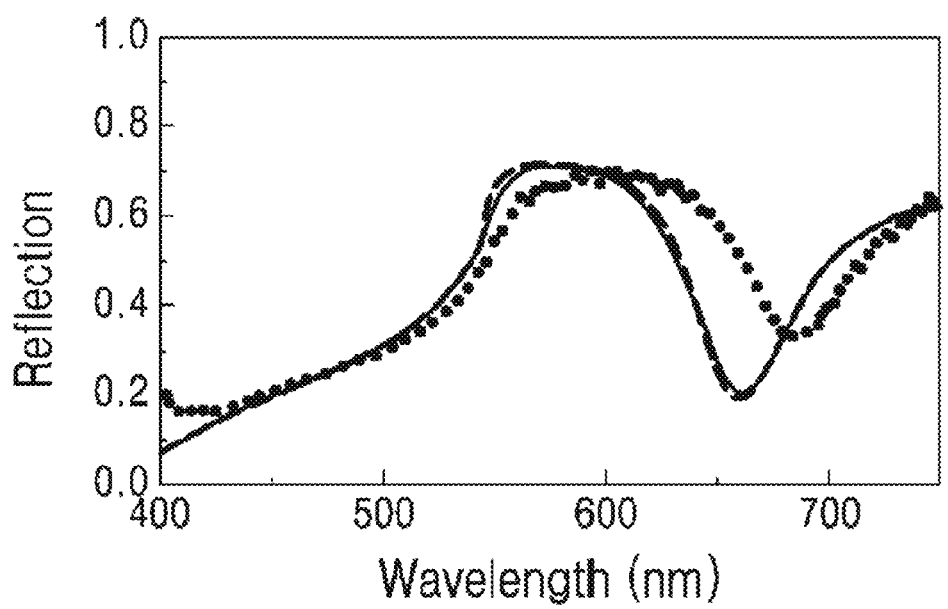
FIG. 8B(iii)
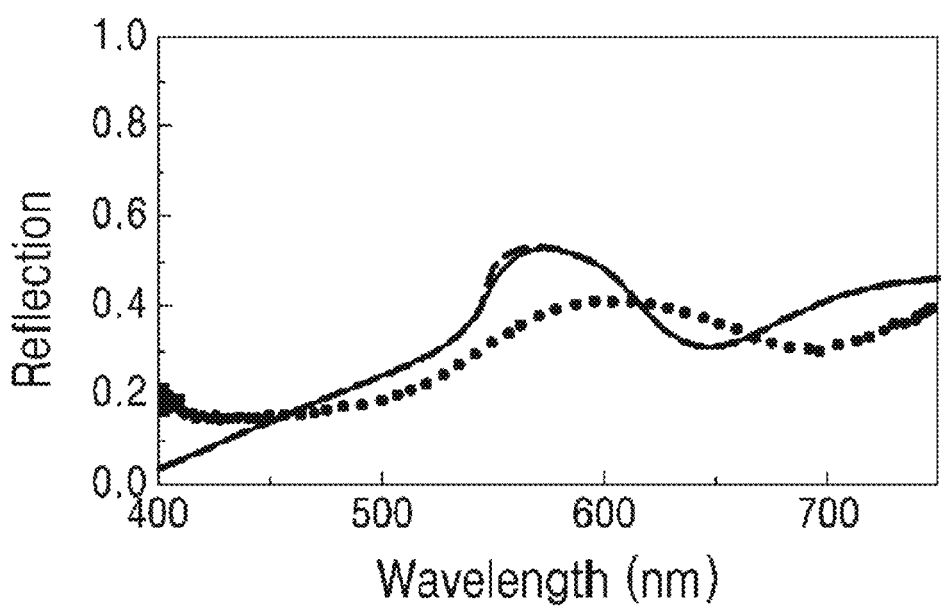

*FIG. 9A(ii)*

FIG. 9A(iii)
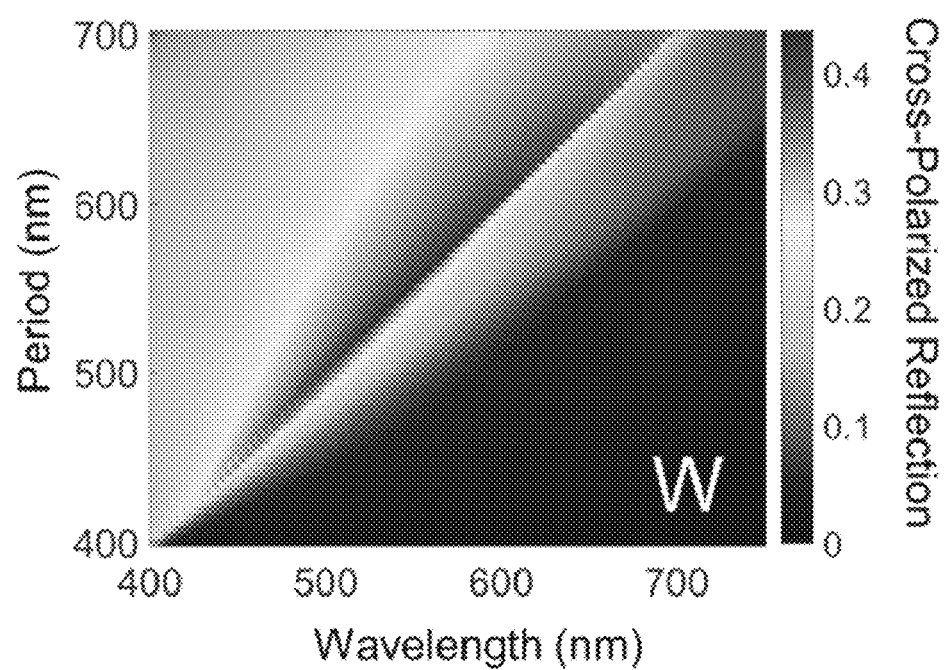

FIG. 9B(ii)
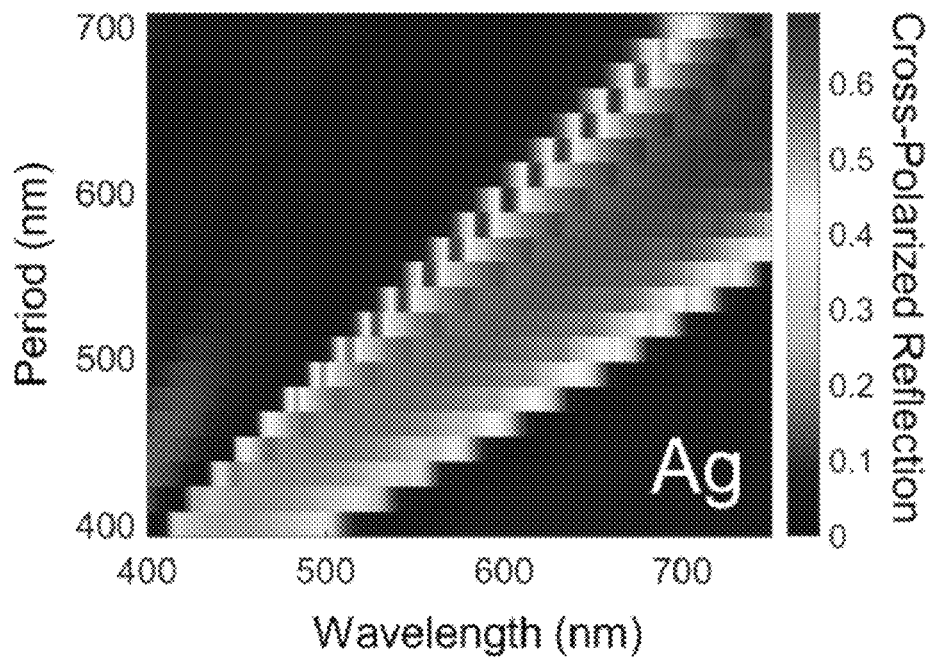
FIG. 9B(iii)
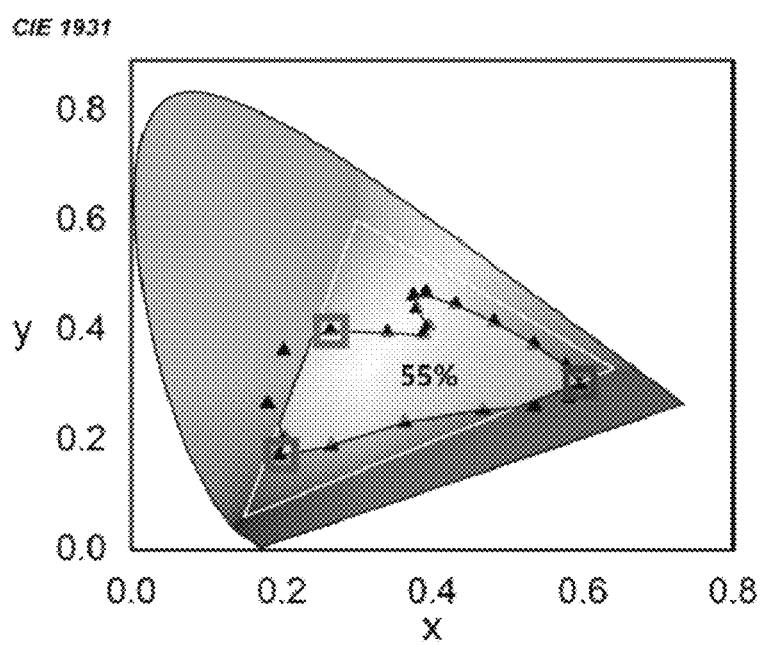

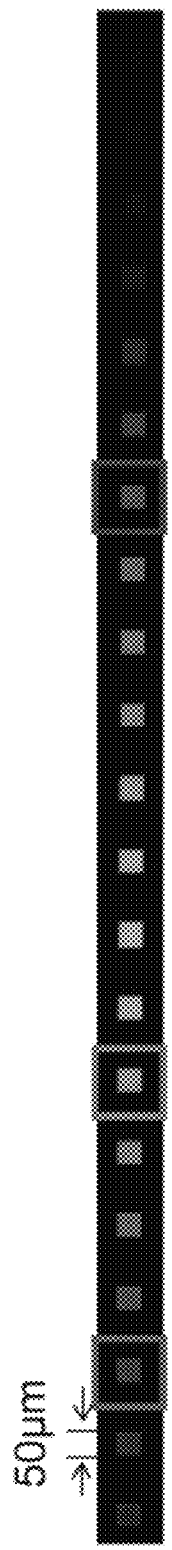
FIG. 9B(iv)

FIG. 9B(vi)

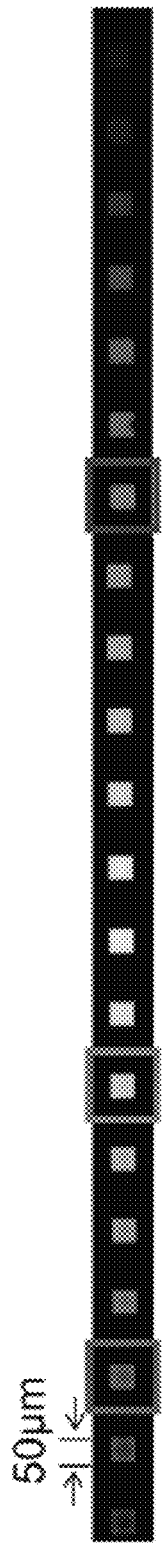
FIG. 9B(vii)

*FIG. 9B(viii)*
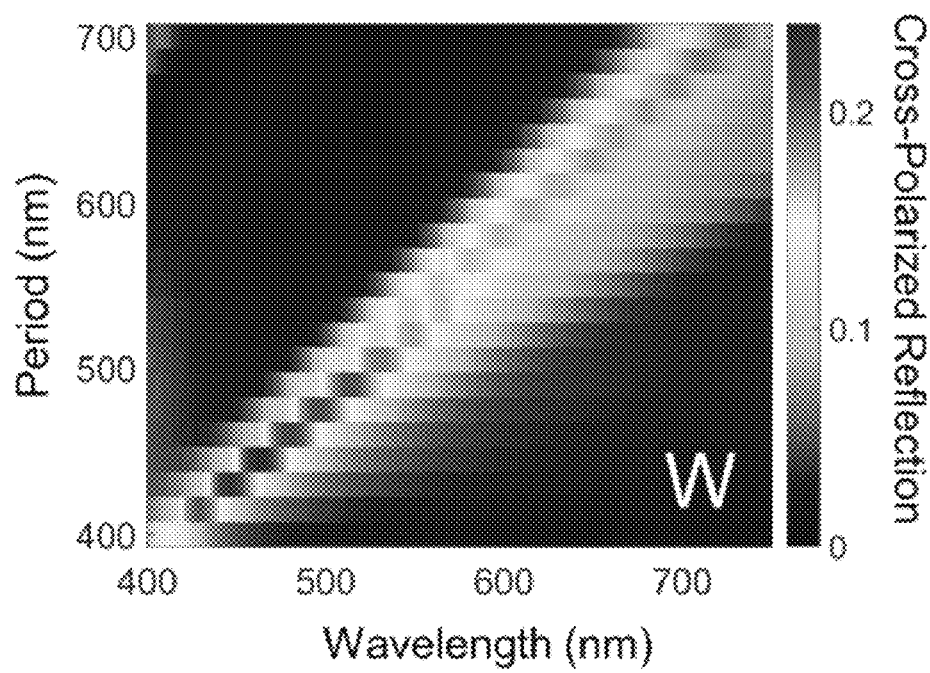
*FIG. 9B(ix)*
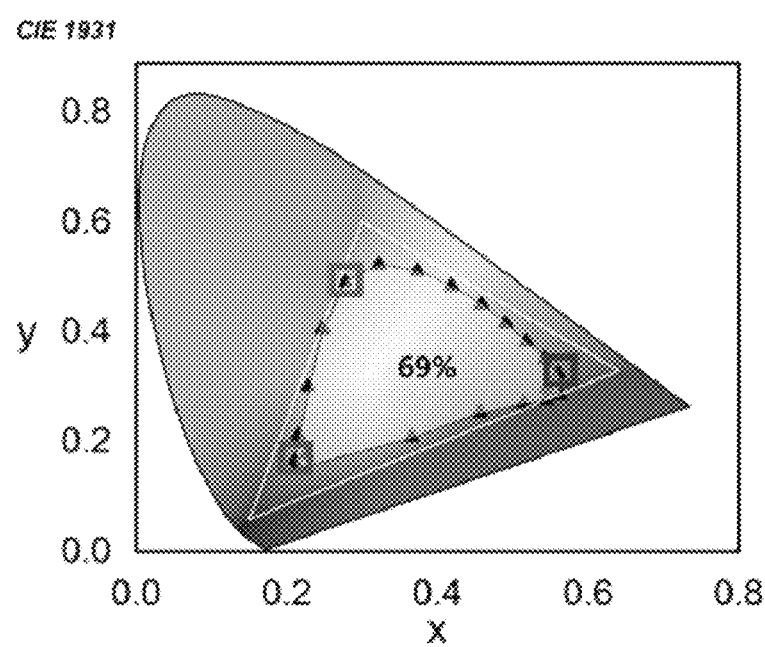

*FIG. 11A(ii)*
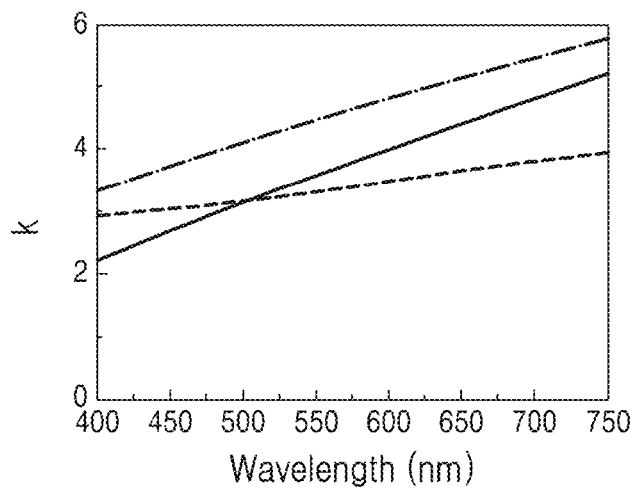
*FIG. 11B(i)*
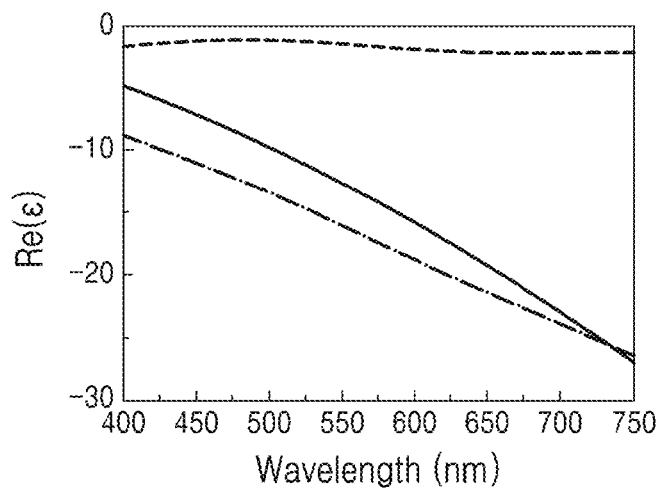

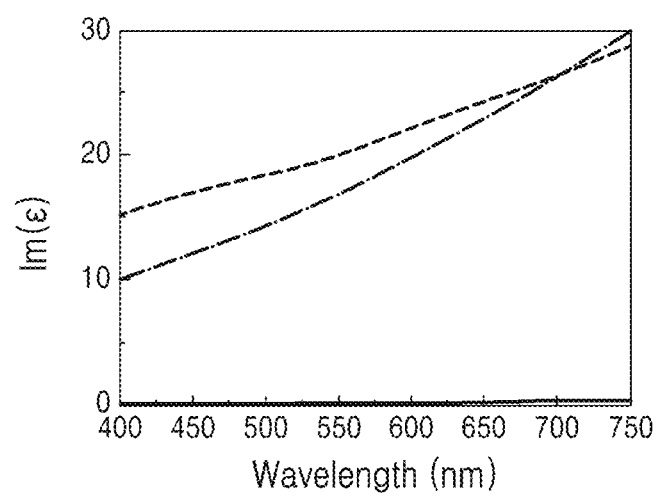
FIG. 11B(ii)

REFLECTIVE COLOR PIXEL BASED ON LOSSY METAL

CROSS-REFERENCE TO RELATED APPLICATIONS

This application is a continuation of PCT Application No. PCT/KR2020/011535, filed on Aug. 28, 2020, which claims priority to Korean Patent Application Number 10-2019-0106717, filed on Aug. 29, 2019, both of which are hereby incorporated by reference in their entirety.

TECHNICAL FIELD

The present disclosure relates to a reflective color pixel including a dielectric grating formed on a lossy metal substrate.

BACKGROUND

Efforts to produce vivid structural colors have been mostly developed based on the use of localized surface plasmons, surface plasmon polaritons (SPPs) and Mie resonance. As for SPP-based systems, metal gratings or array structures have been widely used for diffractive excitation of SPPs and promotion of their interference. In the form of a dielectric hybridized with metal structures, a Mie resonator has been used to generate high resolution color pixels through multipolar resonance or dipolar resonance. In all cases, metals, i.e., Ag and Al, which exhibit relatively low optical loss or near-unity reflectivity in the visible range, represent the main materials for achieving the structures. Such metals provide the optical properties required to produce vivid colors in various designs, but they are limited in number, which limits the CMOS compatibility, the range of chemical functionality for multifunctional purposes or the stability for improved performance. For example, typical oxidation of Ag surface generally impairs optical performance, which promotes extensive research efforts to circumvent this effect. Meanwhile, Pt has resistance to oxidation up to 500° C. and thus provides the potential for increasing optical stability. In addition to Pt, other metals, such as Ni and Pd, provide high corrosion resistance and have catalytic activity. W is compatible with the CMOS process and has the lowest coefficient of thermal expansion among pure metals, and is equivalent in cost to Al, which provides a strong incentive for practical implementation. In particular, W is an interconnect material commonly used in CMOS designs. However, in spite of their interesting properties, the above-described metals exhibit high optical loss and only moderate reflectivity in the visible region in which the use of the metals is hindered in structural color designs. In order to diversify the chemical and physical properties of structural colors, there is a need for a strategy to produce vivid colors of an extended range of metals including highly lossy metals.

PRIOR ART DOCUMENT

Korean Patent No. 10-1691956

DISCLOSURE OF THE INVENTION

Problems to be Solved by the Invention

The present disclosure provides a reflective color pixel including a dielectric grating formed on a lossy metal substrate.

However, problems to be solved by the present disclosure are not limited to the above-described problems. Although not described herein, other problems to be solved by the present disclosure can be clearly understood by those skilled in the art from the following descriptions.

Means for Solving the Problems

An aspect of the present disclosure provides a reflective color pixel including a dielectric grating formed on a lossy metal substrate.

Effects of the Invention

In a reflective color pixel according to embodiments of the present disclosure, lossy metals supporting near-wavelength dielectric gratings exhibit a higher color vibrancy than less lossy metals.

According to embodiments of the present disclosure, the lossy metals have a wider sRGB color gamut coverage than the less lossy metals.

The reflective color pixel according to embodiments of the present disclosure can perform a passive control over the entire visible range by changing the period of the dielectric grating.

The reflective color pixel according to embodiments of the present disclosure can fine-tune the color of reflected light by using an etch width on the dielectric grating.

The reflective color pixel according to exemplary embodiments of the present disclosure increases the monochromaticity of the color shown in the cross-polarized reflection spectrum.

The reflective color pixel according to embodiments of the present disclosure can achieve a high contrast between the pixel and the background by using cross-polarized input/output light.

The reflective color pixel according to embodiments of the present disclosure includes the dielectric grating formed on the lossy metal substrate and thus can achieve high vibrancy of reflected light.

The reflective color pixel according to embodiments of the present disclosure can improve a spectral purity of reflected light with the lossy metals.

BRIEF DESCRIPTION OF THE DRAWINGS

FIG. 3 shows a schematic diagram of a cross-polarized input/output setup, according to an embodiment of the present disclosure.

FIGS. 4E(i) to 4E(iii) and FIGS. 4F(i) to 4F(iii) are cross-sectional views of resonant s-pol electric field distribution and resonant p-pol electric field distribution in grating with a 550 nm-period, 300 nm-etch width, and 200 nm-thickness on Ag, Pt and W substrates, respectively, according to an example of the present disclosure.

FIGS. 9B(ii), 9B(v) and 9B(viii) show measured cross-polarized reflection as a function of period and wavelength from dielectric gratings on Ag, Pt and W substrates, respectively, according to an example of the present disclosure. FIGS. 9B(iii), 9B(vi) and 9B(ix) show CIE chromaticity diagram indicating the measured chromaticities and sRGB coverage ratio, respectively, according to an example of the present disclosure.

FIGS. 11B(i) to 11B(ii) show real and imaginary permittivities (epsilon value) of Ag, Pt and W, respectively, according to an example of the present disclosure.

BEST MODE FOR CARRYING OUT THE INVENTION

Figure 1:
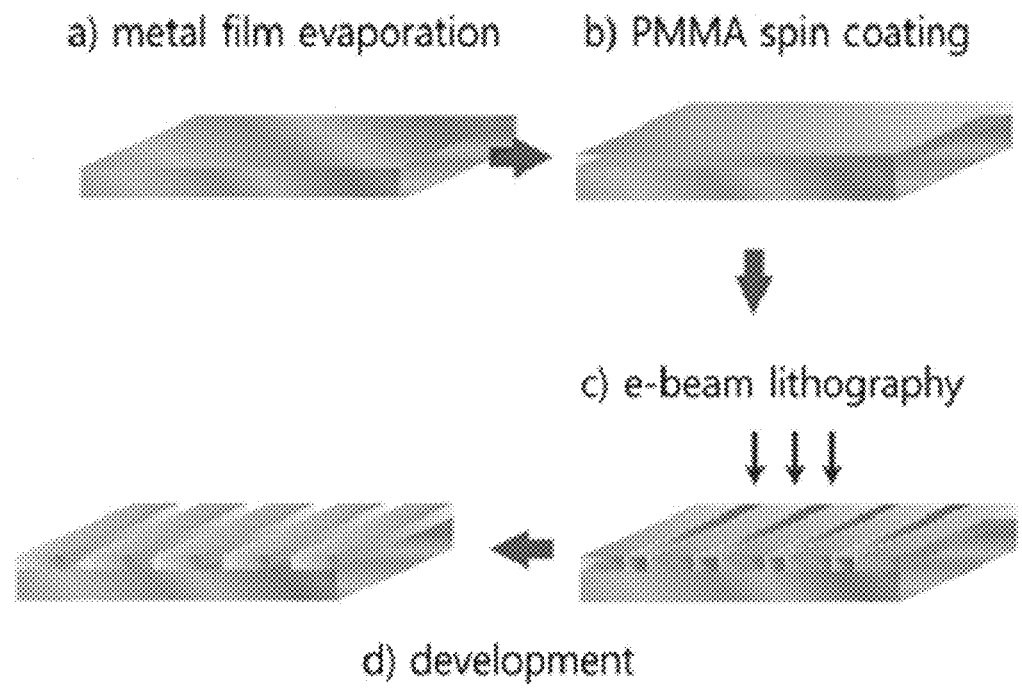
FIG. 1 is a diagram illustrating a fabrication process of a dielectric grating on a metal substrate according to an example of the present disclosure. (a) A metal film (Ag, Pt or W) of optically opaque thickness is deposited on a Si substrate using e-beam evaporation or DC sputtering. (b) A PMMA layer is spin-coated on the Si substrate. (c) Line grating patterns are written onto the PMMA layer by e-beam lithography, and (d) A sample is developed.

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples, and drawings.

An aspect of the present disclosure provides a reflective color pixel including a dielectric grating formed on a lossy metal substrate.

In an embodiment of the present disclosure, the lossy metal refers to a metal with a high optical loss.

In an embodiment of the present disclosure, any metal may be used as the lossy metal. For example, the lossy metal may include Cu, Ni, Co, Pd, Pt or W, but is not limited thereto.

In an embodiment of the present disclosure, the reflective color pixel uses the lossy metal substrate and thus exhibits a higher color vibrancy than when a less lossy metal, such as Ag, is used.

In an embodiment of the present disclosure, the reflective color pixel uses the lossy metal substrate and thus has a wider sRGB color gamut coverage than when a less lossy metal, such as Ag, is used.

In an embodiment of the present disclosure, the lossy metal may support a near-wavelength dielectric grating, but is not limited thereto.

In an embodiment of the present disclosure, the near-wavelength dielectric grating refers to a grating with a period between a wavelength of the dielectric and a wavelength of its surrounding medium.

In an embodiment of the present disclosure, the dielectric grating may be a one-dimensional dielectric grating, but is not limited thereto.

In an embodiment of the present disclosure, the period of the dielectric grating may correspond to a wavelength of colored light implemented by the pixel, but is not limited thereto.

In an embodiment of the present disclosure, the period of the dielectric grating may be from about 300 nm to about 900 nm, but is not limited thereto. For example, the period of the dielectric grating may be from about 300 nm to about 900 nm, from about 400 nm to about 900 nm, from about 500 nm to about 900 nm, from about 600 nm to about 900 nm, from about 700 nm to about 900 nm, from about 800 nm to about 900 nm, from about 300 nm to about 800 nm, from about 400 nm to about 800 nm, from about 500 nm to about 800 nm, from about 600 nm to about 800 nm, from about 700 nm to about 800 nm, from about 300 nm to about 700 nm, from about 400 nm to about 700 nm, from about 500 nm to about 700 nm, from about 600 nm to about 700 nm, from about 300 nm to about 600 nm, from about 400 nm to about 600 nm, from about 500 nm to about 600 nm, from about 300 nm to about 500 nm, or from about 400 nm to about 500 nm, but is not limited thereto.

In an embodiment of the present disclosure, the reflective color pixel may perform a passive control over the entire visible range by changing the period of the dielectric grating, and an increase in the period causes the transition of the color into red.

In an embodiment of the present disclosure, an etch width of the dielectric grating may be from about 130 nm to about 490 nm, but is not limited thereto. For example, the etch width of the dielectric grating may be from about 130 nm to about 490 nm, from about 200 nm to about 490 nm, from about 300 nm to about 490 nm, from about 400 nm to about 490 nm, from about 130 nm to about 400 nm, from about 200 nm to about 400 nm, from about 300 nm to about 400 nm, from about 130 nm to about 300 nm, or from about 200 nm to about 300 nm, but is not limited thereto. However, the ranges of the period and the etch width of the dielectric grating need to satisfy a correlation in which a duty cycle defined by the expression [(the period of the dielectric grating−the etch width of the dielectric grating)/the period of the dielectric grating] is from 0 to 1. For example, the duty cycle may be from 0 to about 1, from about 0.2 to about 1, from about 0.4 to about 1, from about 0.6 to about 1, from about 0.8 to about 1, from 0 to about 0.8, from about 0.2 to about 0.8, from about 0.4 to about 0.8, from about 0.6 to about 0.8, from 0 to about 0.6, from about 0.2 to about 0.6, from about 0.4 to about 0.6, from 0 to about 0.4, from about 0.2 to about 0.4, or from about 0 to about 0.2, but is not limited thereto.

In an embodiment of the present disclosure, the reflective color pixel may fine-tune the color by using the etch width on the dielectric grating.

In an embodiment of the present disclosure, the pixel may reflect colored light whose spectral purity can improve for the lossy metal with respect to an input polarizer incident to the pixel in a 45° direction, but is not limited thereto.

In an embodiment of the present disclosure, the pixel may receive an s-polarized field and a p-polarized field, which are two orthogonal components of incident polarization passing through the input polarizer defined with respect to the dielectric grating, and the pixel may transmit only reflected light rotated by an angle of ±π/2 when an output polarizer is cross-polarized, but is not limited thereto.

In an embodiment of the present disclosure, the polarization of the reflected light and the polarization of the incident light are orthogonal to each other through a cross-polarization filter and are aligned to be ±45° with respect to the grating vector, and the reflected light is filtered through a cross-polarizer.

In an embodiment of the present disclosure, the reflected light undergoes an additional phase shift by which only one of the two components (p-polarized field and s-polarized field) rotates the total polarization vector by π/2. That is, only the p-polarized field is rotated by 180°, and the s-polarized field is rotated by an additional 180°.

In an embodiment of the present disclosure, the reflective color pixel has the effect of reducing the number of distinct spectral peaks in the cross-polarized reflection spectrum from two to one, which increases the monochromaticity of the produced color.

In an embodiment of the present disclosure, the reflective color pixel can achieve a high contrast between the pixel and the background by using cross-polarized input/output light and can reduce the background signal to nearly zero (0), which makes it possible to obtain a high contrast ratio.

In an embodiment of the present disclosure, the grating structure may be composed of a three-layer system, and the system may include an air layer, a grating layer and a reflective layer, but is not limited thereto.

In an embodiment of the present disclosure, the p-polarized field may be located at an interface between the metal layer and the grating layer, and the s-polarized field may be located at an interface between the air layer and the grating layer, but is limited thereto.

In an embodiment of the present disclosure, the s-polarized field is spatially separated from the metal and the p-polarized field is directly affected by the loss from the metal, and the s-polarized field is less sensitive to the loss from the metal than the p-polarized field.

In an embodiment of the present disclosure, since the location of the s-polarized light field may be the same depending on the duty cycle or etch width over the entire visible range, it is possible to intuitively recognize a passive color control.

In an embodiment of the present disclosure, the pixel includes the lossy metal substrate and thus can achieve a multifunctional filter function, a catalytic function, CMOS compatibility or improved thermal stability, but is not limited thereto.

In an embodiment of the present disclosure, the reflective color pixel uses the lossy metal substrate and thus can reflect light of a color capable of improving a spectral purity of the reflected light.

MODE FOR CARRYING OUT THE INVENTION

Hereinafter, the present disclosure will be explained in more detail with reference to Examples. However, the following Examples are illustrative only for better understanding of the present disclosure but do not limit the present disclosure.

EXAMPLES

<Sample Fabrication>

A Si wafer, cleaned by rinsing with Acetone and IPA, was used as a substrate. To evaluate the influence of loss in metals, the patterned grating was prepared on three metal substrates: Ag, Pt and W.

Lossy metal (Ag, Pt or W) was deposited onto the Si wafer with optically-opaque thicknesses to create a reflective layer. For the Ag film, a sub-1 nm thickness (thick) Ge wetting layer and 170 nm-thick Ag film were sequentially deposited onto the Si wafer by e-beam evaporation with depositions rates of 0.04 nm/sec and 0.3 nm/sec, respectively. For the Pt substrate, a sub-1 nm-thick Ti film wetting layer and 200 nm-thick Pt film were sequentially deposited onto the Si wafer using DC sputtering. The base pressure was $<5 \times 10^{-6}$ torr and Ar gas was injected as 4 mTorr under a target power of 40 W providing a deposition rate of 0.125 nm/s and 0.3 nm/sec respectively. For the W substrate, a 200 nm-thick W layer was deposited directly onto the Si wafer using DC sputtering under the same deposition conditions, producing a deposition rate of 0.15 nm/sec. A ~200 nm-thick PMMA layer was spin-coated on top of the metal layer at 3000 rpm for the Ag, Pt and W substrates. Line grating patterns were written onto the PMMA layer by ebeam lithography, and developed in MIBK:IPA=1:1 solution. The ~200 nm-thick developed PMMA resist layer was used as the dielectric grating (FIG. 1).

FIG. 1 indicates fabrication process of dielectric grating on metal. a) of FIG. 1 indicates a metal film (Ag, Pt or W) of optically opaque thickness is deposited onto a Si substrate using e-beam evaporation or DC sputtering, b) of FIG. 1 indicates a PMMA layer is spin-coated onto the Si substrate, c) of FIG. 1 indicates line grating patterns are written onto the PMMA layer by e-beam lithography, and d) of FIG. 1 indicates sample is developed.

Here, W is known to display one of the poorest optical figures of merits due to its large loss.

<Measurement Setup>

Reflection measurements were performed by illuminating a pixel with white light sourced from a halogen lamp (Olympus corporation) that reflects into a 0.15 NA objective lens via a 50/50 beam splitter. The reflected image was read by an x-y translatable pinhole fiber coupled to a spectrometer (Acton SP2300, Princeton Instruments) or imaging CCD, respectively. Orthogonally oriented polarizers were inserted into the input and output beam paths to null the background (i.e., area outside the grating) signal. The grating was rotated 45° with respect to the polarization direction of the input polarizer.

Figure 2A:
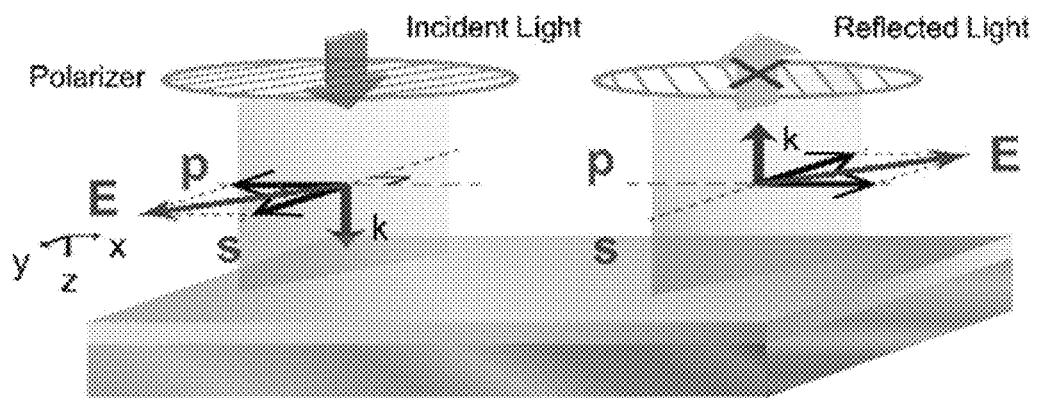
FIG. 2A and FIG. 2B show schematic diagrams of an unpatterned PMMA film constituting the background and an etched PMMA grating representing a pixel, according to an example of the present disclosure.
Figure 2B:
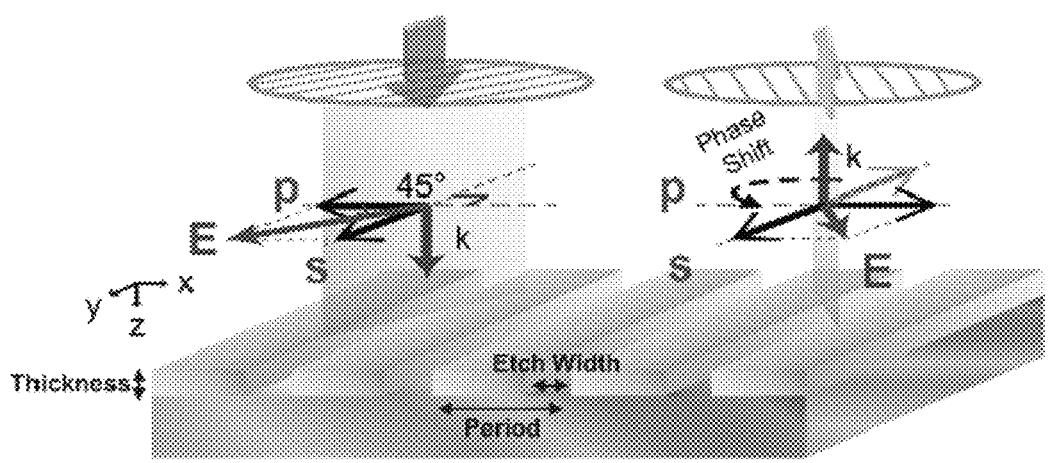

FIG. 2A and FIG. 2B illustrate the schematic of the background and pixel under a cross-polarized input/output light configuration, respectively. The pixel consists of a 1D dielectric grating on a metal substrate. More specifically, FIG. 2A indicates an unpatterned PMMA film constituting the background, and FIG. 2B indicates an etched PMMA grating representing a pixel. Normally incident light is polarized 45° with respect to the grating vector. Reflected light is filtered by a cross-polarizer, which blocks light from the background FIG. 2A, but transmits it from the pixel FIG. 2B because the polarization vector undergoes a 90° rotation.

FIG. 3 indicates schematic of the cross-polarized input-output setup.

<Calculations>

FDTD calculations were performed with a commercial FDTD software package (Lumerical solutions). To calculate the cross-polarized reflection, a 3D unit cell of the grating oriented 45° with respect to a planewave incident field was investigated, where the reflected field component orthogonal to the incident field was recorded. Bloch boundary conditions were used for the x-y dimensions while PML boundary conditions were used for the z dimension. Varying mesh sizes were used throughout the grating structure, where the smallest mesh size of $2 \times 2 \times 2$ nm$^3$ was implemented at the metal-dielectric grating interface.

The polarization of incident and reflected light was configured to be orthogonal to one another through the use of cross-polarized filters, and ±45° with respect to the grating vector. The 45° polarization orientation of incident light relative to the grating ensures that the grating receives two orthogonal components (s-pol and p-pol) of light with equal contribution. For light reflecting from the bare background, which consists of an unpatterned PMMA film on a metal substrate (FIG. 2A), both s-pol and p-pol light experience a $\pi$ phase shift, due to the higher impedance of the metal surface. The simultaneous $\pi$ phase shift by both components preserves the incident light polarization angle. Since the output polarizer is orthogonal to the input light polarization, the reflected light cannot transmit through, resulting in a dark background. However, for light reflecting from the grating, only one of the two components undergoes an additional phase shift that rotates the total polarization vector by $\pi/2$. This rotation allows the reflected light to transmit through the output polarizer, resulting in a detected signal.

Figure 2C:
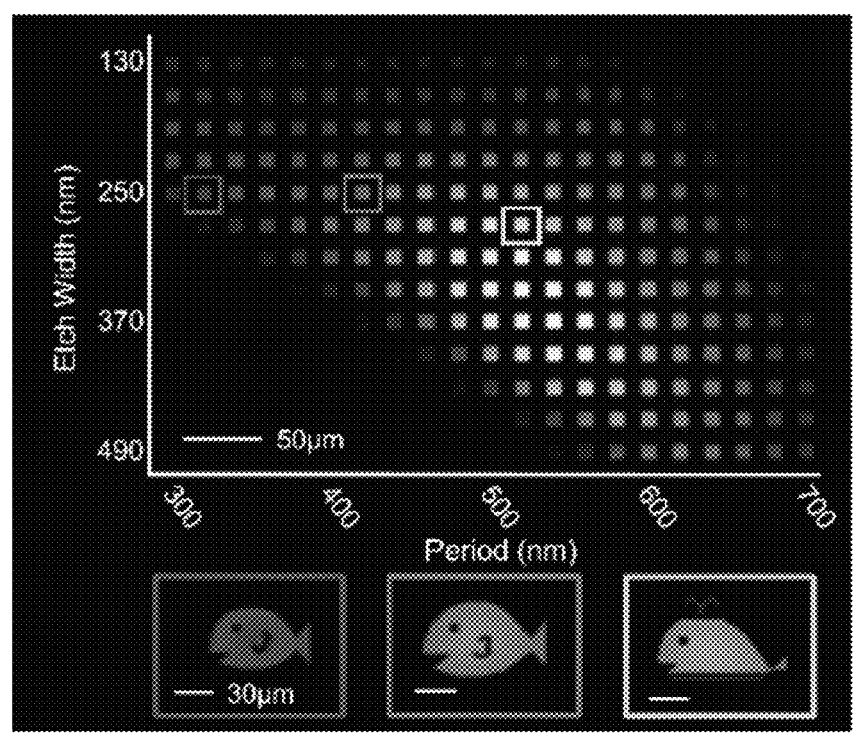
FIG. 2C shows a color palette of pixels on a Pt substrate with varying periods and etch widths, according to an example of the present disclosure.

FIG. 2C illustrates a color palette of pixels on a Pt substrate with varying periods and etch widths of vibrant colors achieved through the configuration. Each pixel consists of a $10 \times 10$ µm$^2$ PMMA grating on a Pt substrate, excited by polarized light rotated 45° with respect to the grating and detected through a cross-polarizer. The insets of FIG. 2C illustrate fish cartoons designed from pixels of the same color indicated by boxes in the palette.

<Characteristic Analysis>

Using a coupled waveguide-array mode formalism, we show that spectrally distinct and sharp s-pol and p-pol grating supermode resonances appear within a near-wavelength dielectric grating on a metal substrate, where a phase difference between the s-pol and p-pol reflected field transitions by $2\pi$ over each resonance. Such a scheme rotates the total field polarization by 90° over the wavelengths. Therefore, under a cross-polarized input/output light configuration, reflected light from the pixel is allowed to transmit through the output polarizer, resulting in a sharp reflection peak while that from the background is cancelled, providing high pixel contrast. We demonstrate that the p-pol grating supermode resonance is highly sensitive to losses from the metal due to its spatial overlap with the metal interface while the s-pol resonance is less sensitive as it occurs near the air-grating interface. By exploiting these inherent losses, the p-pol response can be minimized in our cross-polarized input/output scheme whereas the s-pol response remains sharp. Such a strategy allows lossy metals to achieve large sRGB gamut coverages characterized by vivid colors that exceed those from highly reflective metals such as Ag, while maintaining similar pixel color contrast ratios. These results enable an expanded range of metal types to be applied in structural color designs including those that exhibit lossy optical characteristics but distinctive chemical and physical properties for chemically active or ultra-robust color generation schemes.

The Period and the Etch Width of the Dielectric Grating

The period and the duty cycle of the dielectric grating differs for every pixel at ranging from 300 nm to 700 nm and from 0 to 1, respectively. One can see that the color can be passively controlled across the full visible range by varying the grating period, and fine-tuned through the etch width. Increasing the period redshifts the color. Tilted SEM images (FIGS. 2D(i) to 2D(iii)) show etched PMMA grating structures representing purple, green, and yellow pixels, where periods (and etch widths) of 320 (250) nm, 420 (250) nm, and 520 (280) nm were used, respectively.

Figure 2D:
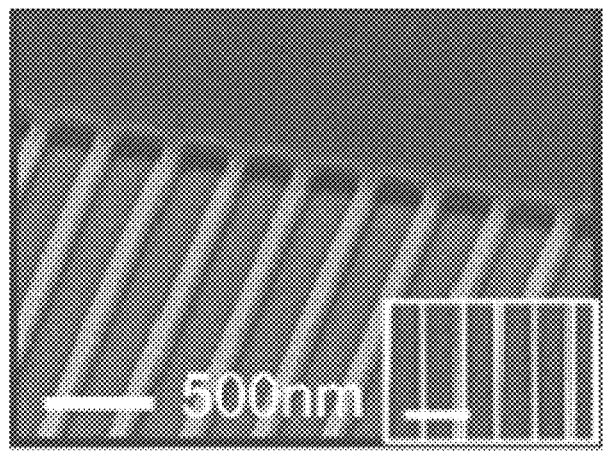
FIGS. 2D(i) to 2D(iii) show SEM images of the three pixels in FIG. 2C viewed from an angle, according to an example of the present disclosure.
Figure 2D:
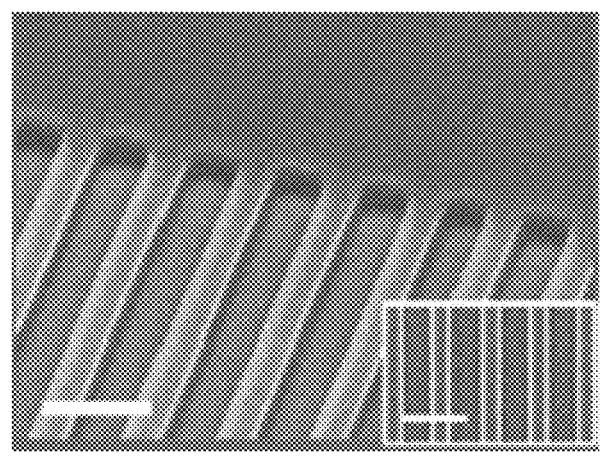

Specifically, FIGS. 2D(i) to 2D(iii) are SEM images of the three pixels in FIG. 2C viewed from an angle and the insets of FIGS. 2D(i) to 2D(iii) are SEM images of the three pixels viewed from the top.

The insets show a top view image of each grating, illustrating the regularity and uniformity of the etched structures. Despite the inherent optical loss of Pt, the pixel colors are vivid and their contrast against the background is high because the background signal is cancelled by the cross-polarized input-output scheme. We show further that the vivid colors can be incorporated into designed patterns on the micrometer scale.

FIG. 2C demonstrates three fish of different colors with lateral and transverse dimensions of 100×70 µm², 130×90 µm², and 140×90 µm² made with the purple, green and yellow pixels described above, from left to right, respectively.

Figure 4A:
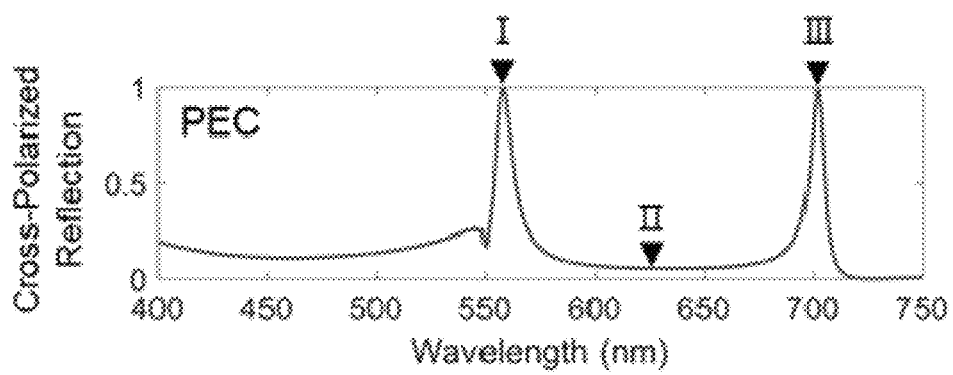
FIG. 4A shows a calculated cross-polarized reflection spectrum from a dielectric grating with a 550 nm-period, 150 nm-etch width, and 200 nm-thickness on a PEC substrate, according to an example of the present disclosure.

FIG. 4A shows the simulated reflection spectrum from a dielectric grating on a PEC substrate, with a period, etch width, thickness and refractive index of 550 nm, 150 nm, 200 nm and 1.5, respectively, excited by an input field rotated 45° relative to the grating. In FIG. 4A, I and III denote resonant wavelengths from the s-pol and p-pol component, respectively, and II denotes a non-resonant wavelength. The cross-polarized component of the reflected field was used to calculate the reflected intensity. One can find two sharp peaks in the spectrum, whose spectral positions coincide with those of the 90° transition in tilt angle of the polarization ellipse, shown in FIGS. 5G(i) and 5G(ii). These results indicate that the sharp cross-polarized reflection peaks are generated from the s-pol and p-pol grating supermode resonances within the grating.

Figure 4B:
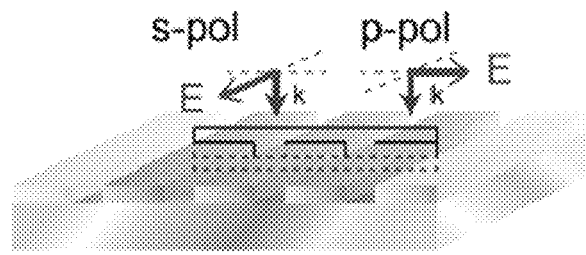
FIG. 4B shows a schematic of grating on metal substrate, and orientation of s-pol and p-pol field components, according to an example of the present disclosure.

FIG. 4B indicates schematic of grating on metal substrate, and orientation of s-pol and p-pol field components and outlined box shows cross-sectional area of visualized field distribution.

Figure 4C:
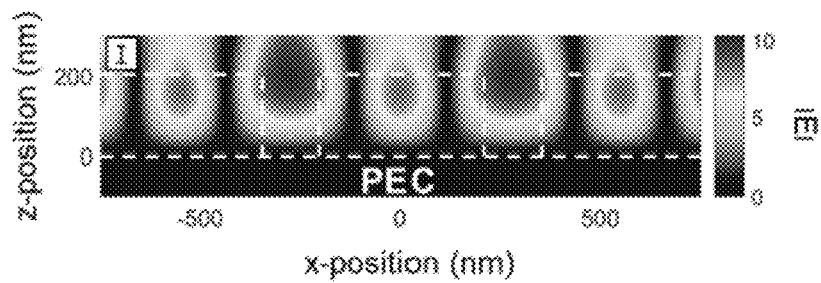
FIGS. 4C(i) to 4C(iii) and FIGS. 4D(i) to 4D(iii) are cross-sectional views of s-pol and p-pol electric field distributions in grating on PEC substrate, respectively, according to an example of the present disclosure.

FIGS. 4C(i) to 4C(iii) indicate cross-sectional view of s-pol electric field distributions in grating on PEC substrate at the three wavelengths shown in FIG. 4A and FIGS. 4D(i) to 4D(iii) indicate cross-sectional view of p-pol electric field distributions in grating on PEC substrate at the three wavelengths shown in FIG. 4A.

FIGS. 4C(i) to 4C(iii) show that the shorter wavelength peak (I) corresponds to a resonant mode, characterized by a highly concentrated field shared between air and dielectric grating elements. Under s-pol light, no such resonance is observed at other wavelengths (II) including that of the p-pol resonance (III). As shown in FIGS. 4D(i) to 4D(iii), the p-pol resonance is found to occur at a longer wavelength (III), characterized by a mode profile that strongly contrasts with that of the s-pol resonance. Likewise, such resonant field is absent at other wavelengths (I, II). In FIGS. 4D(i) to 4D(iii), one can see that the p-pol mode is highly concentrated at the metal-grating interface, a feature that mimics the behavior of a SPP. Because the reflecting metal is a PEC, we identify this mode as a spoof SPP, as also reported in other high contrast gratings on a PEC. In case of real metals, its excitation requires power, allowing it to be identified as a SPP.

Figure 5A:
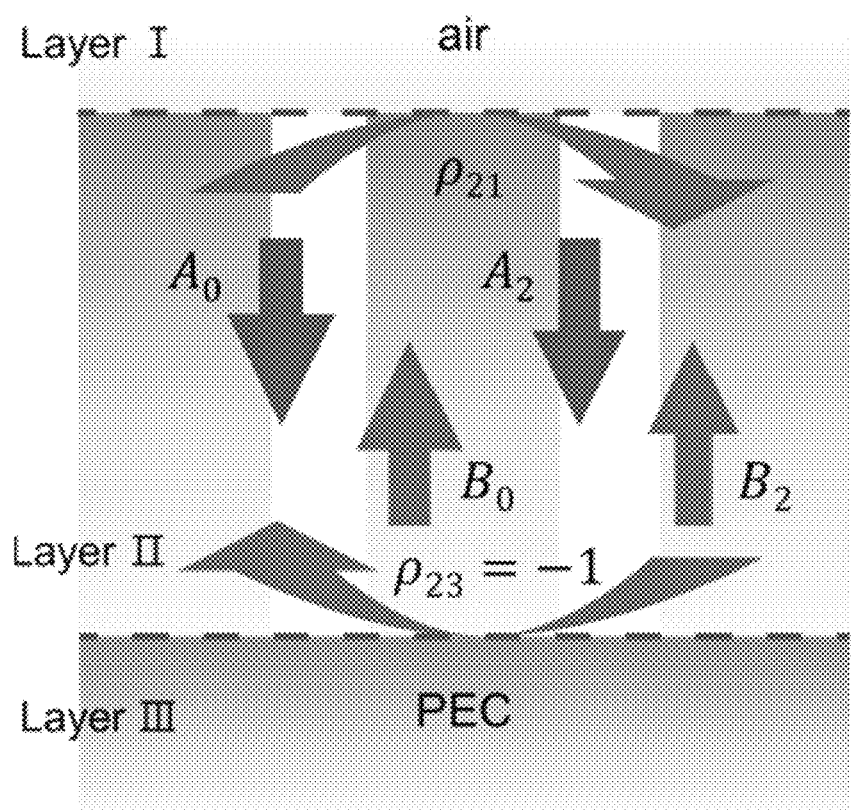
FIG. 5A is a schematic of vertically traversing waveguide-array modes in a near-wavelength dielectric grating on a PEC substrate, according to an example of the present disclosure.
Figure 10:
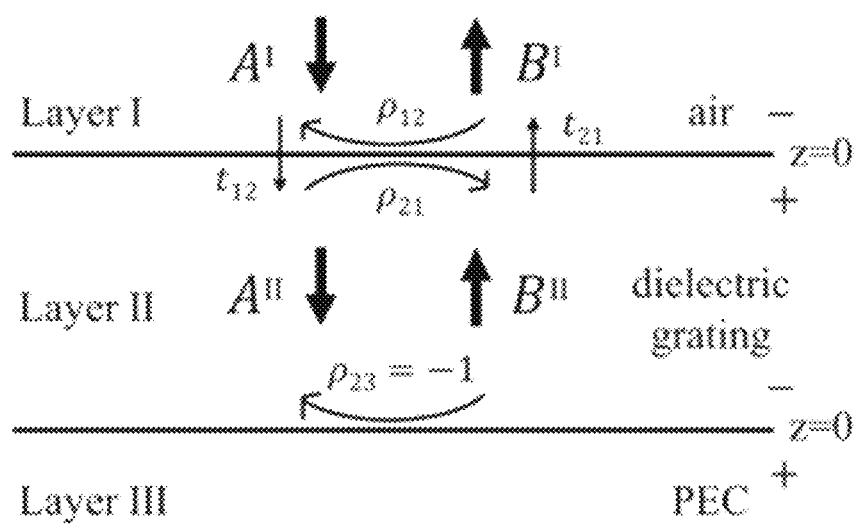
FIG. 10 is a schematic diagram of mode propagation in an air-grating-PEC system, according to an example of the present disclosure.

FIG. 5A shows the schematic of vertically traversing waveguide-array modes in the dielectric grating. The grating structure is treated as a three layer system, consisting of an air, grating, and reflective layer. We use a perfect electrical conductor (PEC) as the reflective substrate to generalize the role of waveguide-array modes in reflection and to establish period dependent spectral trends in their behavior. Normally incident light couples to two waveguide-array modes present in the grating characterized by real propagation constants. These modes then propagate downward, accumulating phase differences through the dielectric thickness. Upon reaching the PEC substrate, all modes are perfectly reflected onto themselves ($\Gamma=\rho_{23}=-1$), and propagate upward, repeating the accumulation of phase differences (FIG. 10). After completing one round trip, the modes can transmit into air by coupling to the $0^{th}$ order diffraction mode, or they can reflect back into the grating at the air-grating interface due to an impedance mismatch, causing them to couple into each other. As described by Yang et al. the overlap between waveguide-array modes and diffraction modes in free space, and the propagation of waveguide-array modes within the dielectric can be expressed by two N×M matrices, $\rho$ and $\phi$, respectively, where N and M are the number of diffraction and waveguide-array modes considered in the calculation. The eigenmodes of their products, called supermodes, distill all the essential optical characteristics of the grating. Pronounced features in the reflection spectrum can be understood as resonances of the supermodes within an effective cavity defined by the air-grating and metal-grating interfaces.

Figure 5B:
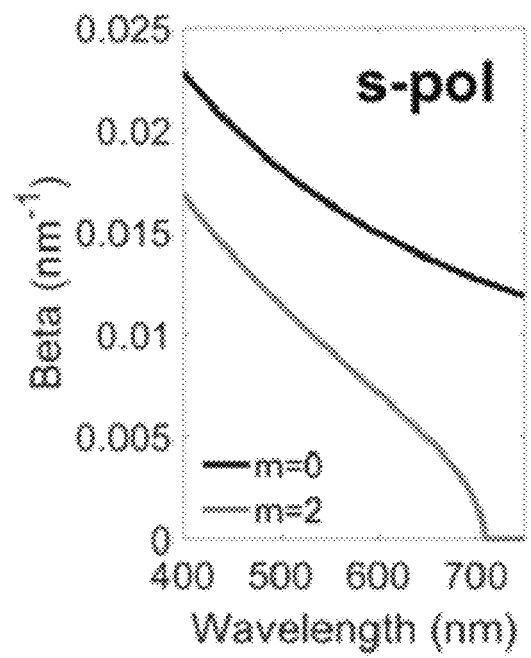
FIGS. 5B(i) and 5B(ii) show dispersion curves of s-pol and p-pol waveguide-array modes in a dielectric grating with a 550 nm-period, respectively, according to an example of the present disclosure.
Figure 5B:
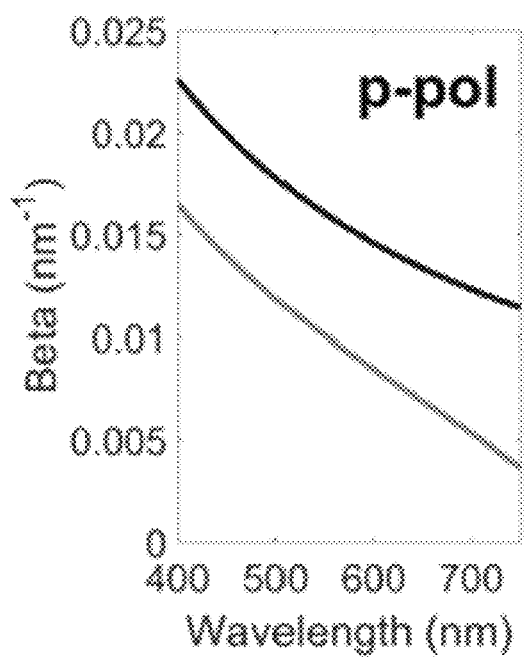

Different boundary conditions for s-pol and p-pol light result in different modal characteristics. FIGS. 5B(i) and 5B(ii), FIGS. 5C(i) and 5C(ii), FIG. 5D, FIG. 5E, FIG. 5F, and FIGS. 5G(i) and 5G(ii) indicate calculations, using the coupled waveguide-array mode formalism, of grating characteristics for a dielectric grating on a PEC substrate with fixed etch width of 150 nm and grating index of 1.5.

FIGS. 5B(i) and 5B(ii) show the calculated actual dispersion curves (i.e., wavenumber) of s-pol (FIG. 5B(i)) and p-pol (FIG. 5B(ii)) waveguide-array modes for gratings with period, etch width, thickness and refractive index of 550 nm, 150 nm, 200 nm and 1.5, respectively.

At normal incidence, the incident field is symmetric about the etch and grating interface. Therefore, only waveguide-array modes with even mode profiles can be excited. Two such modes (m=0 and 2) are present for both s and p-pol light, as shown in FIGS. 5B(i) and 5B(ii). It is the interplay between these two waveguide-array modes that determines the reflection characteristics of the grating within the respective polarized state. Subtle differences in the modal characteristics between the s-pol and p-pol waveguide-array modes can be observed. While the $0^{th}$ order waveguide-array mode behaves similarly for the two polarizations, the $2^{nd}$ order mode displays distinctive behavior, characterized by the presence and absence of a cutoff near ~700 nm for the s-pol and p-pol mode, respectively.

A consequence of the different modal behavior between the $2^{nd}$ order s-pol and p-pol waveguide-array modes is further manifested as a phase difference between the $0^{th}$ order s-pol and p-pol reflected field. Using the waveguide-array formalism described above, we calculate the phases of the $0^{th}$ order s-pol and p-pol reflected field, as a function of period and wavelength (FIGS. 5C(i) to 5C(ii)). The thickness of the grating is 200 nm.

Figure 5C:
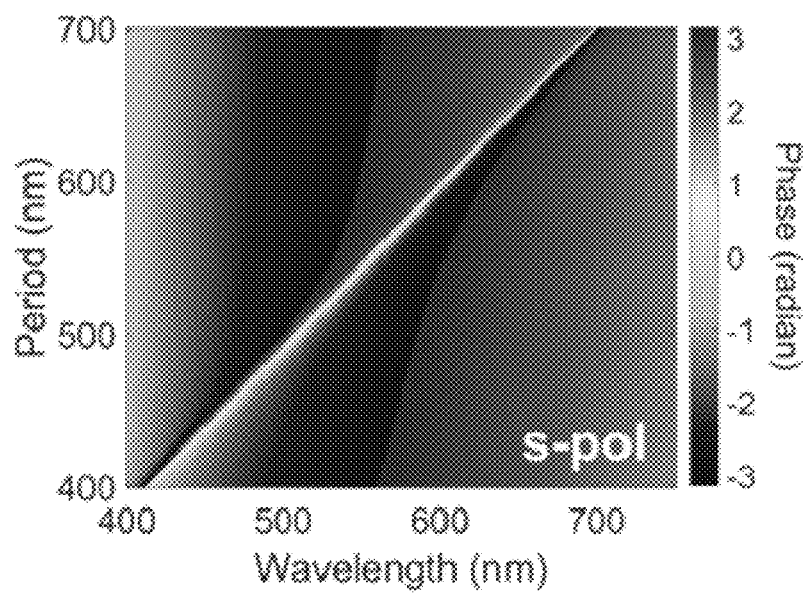
FIGS. 5C(i) and 5C(ii) show phases of s-pol and p-pol reflected fields as a function of period and wavelength, respectively, according to an example of the present disclosure.
Figure 5C:
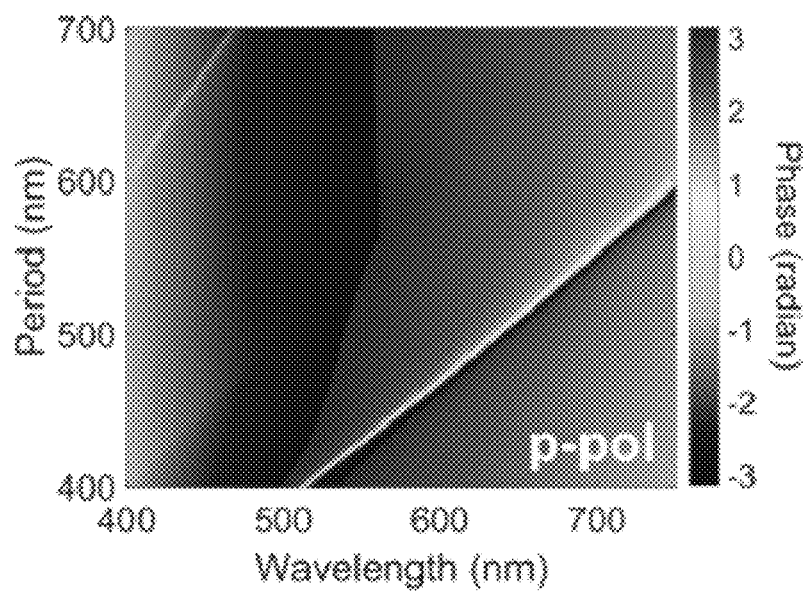

FIGS. 5C(i) and 5C(ii) indicate the phase of s-pol (FIG. 5C(i)) and p-pol (FIG. 5C(ii)) reflected field as a function of period and wavelength.

An abrupt phase shift is found to occur for wavelengths coinciding with the period for the s-pol reflected field, and at longer wavelengths for the p-pol field. These phase shifts originate from resonances of the grating supermode, where strong buildup of field intensities is accompanied by sudden phase transitions.

Figure 5D:
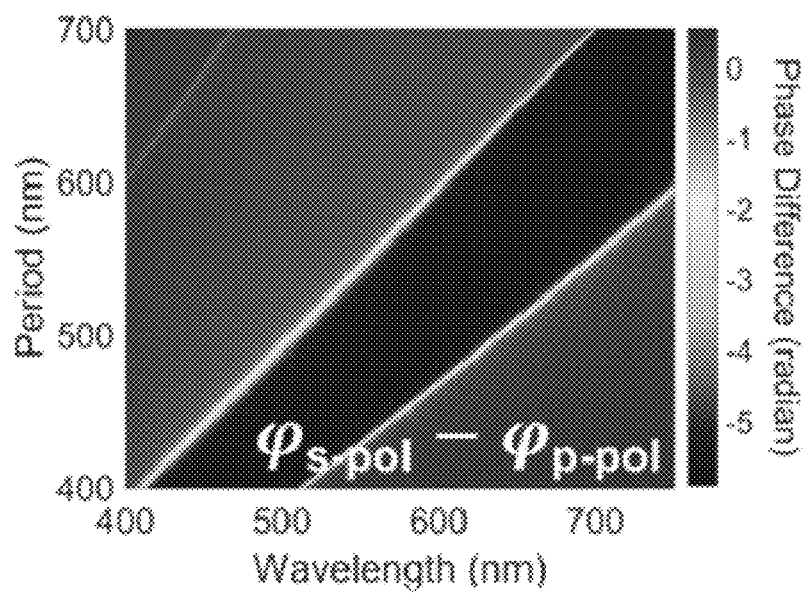
FIG. 5D shows the phase difference between the s-pol and p-pol reflected fields as a function of period and wavelength, according to an example of the present disclosure.

FIG. 5D shows the phase difference between the s-pol and p-pol reflected fields. One can see that the phase difference is near zero for all periods and wavelengths except within a band defined by boundaries that coincide with the positions of the phase shifts seen in the individual phase maps of the s-pol and p-pol reflected fields. Inside the band, the phase difference reaches approximately $2\pi$. This indicates that inside and outside the band, the superposition of the two reflected components (i.e., the total reflected field) is linearly polarized along 45°. However, at the boundaries of the band, the phase difference abruptly changes from near zero to $2\pi$, causing the total field to become elliptically or circularly polarized in the process.

Figure 5E:
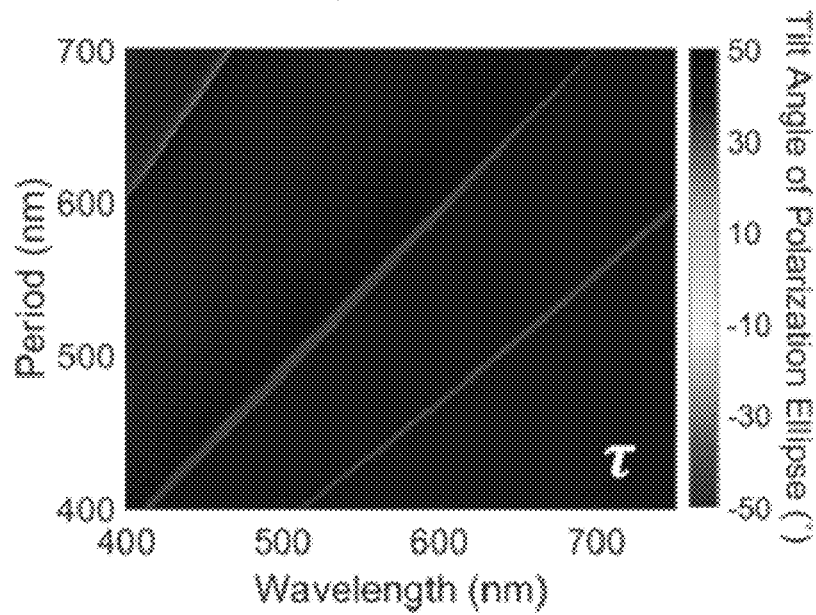
FIG. 5E shows the tilt angle of a polarization ellipse as a function of period and wavelength, according to an example of the present disclosure.

FIG. 5E shows the calculated tilt angle of the polarization ellipse that results from the phase difference. One can see that the tilt angle undergoes an abrupt change at the boundary of the band shown in FIG. 5D.

Figure 5F:
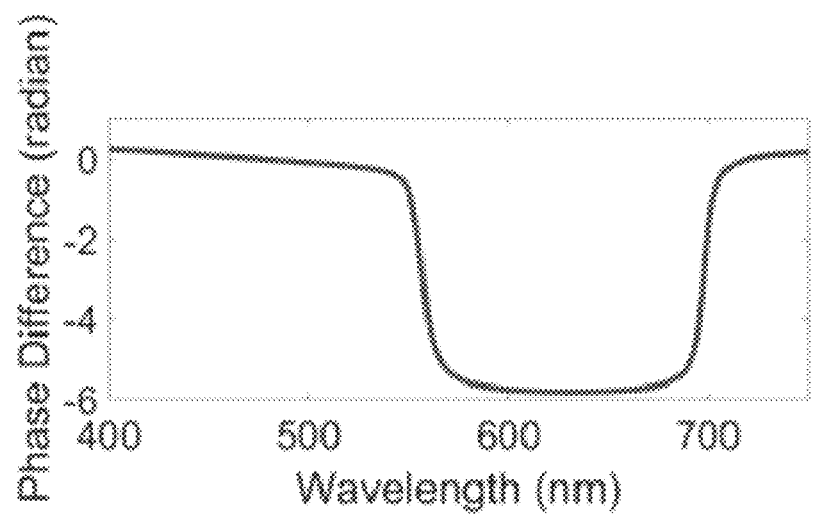
FIG. 5F and FIGS. 5G(i) to 5G(ii) show the phase difference and the tilt angle of the polarization ellipse at a 550 nm-period as a function of wavelength, respectively, according to an example of the present disclosure.
Figure 5G:
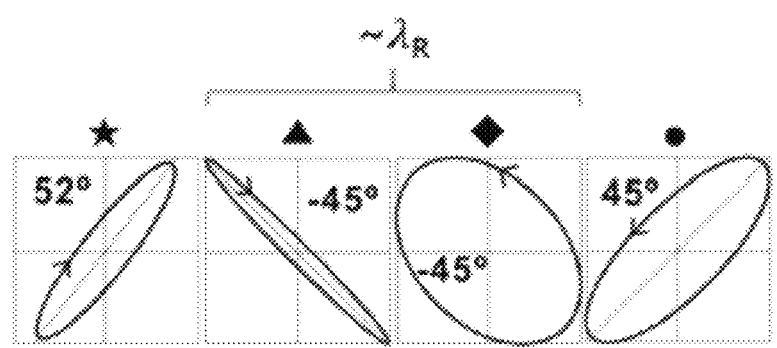

To observe this relation more clearly, we show the phase difference and tilt angle for the specific case of a 550 nm period-grating in FIG. 5F and FIGS. 5G(i) and 5G(ii), respectively. One can see that for each phase difference transition, near 560 nm and 700 nm, the tilt angle rotates abruptly from 45° to −45°, as shown in FIG. 5F.

FIG. 5F indicates the phase difference of the polarization ellipse at a 550 nm-period as a function of wavelength. FIGS. 5G(i) and 5G(ii) indicates the tilt angle of the polarization ellipse at a 550 nm-period as a function of wavelength. FIG. 5G(i) indicates polarization ellipses denoted with rotation direction and tilt angle at wavelengths indicated by markers in the spectrum of FIG. 5G(ii).

FDTD simulation that models the cross-polarized reflection from our experimental setup confirms the detection of spectrally narrow peaks at the s-pol and p-pol phase transitions.

To visualize the grating supermode resonances, we separately simulate and display the s-pol and p-pol mode profiles (schematic in FIG. 4B) in FIGS. 4C(i) to 4C(iii) and FIGS. 4D(i) to 4D(iii), respectively. As described in FIGS. 5C(i) to 5C(ii), the s-pol resonance occurs at a shorter wavelength than that of the p-pol resonance.

FIG. 5G(i) displays four representative elliptically polarized states denoted by their rotation directions near and within the ~560 nm resonance. For increasing wavelengths, the polarization ellipse starts at a 45° tilt angle, briefly reaches 52° (FIG. 5G(i), ★), and soars to −45° at resonance (FIG. 5G(i), ▲). In the last case, the field vector rotates clockwise and the polarization axial ratio (ratio between semi-major and semi-minor axis) is large, indicating an almost linearly-polarized state. Although the tilt angle remains the same, at the red-end of the resonance, the polarization ellipse switches its rotation direction to counter-clockwise and experiences a decreased axial ratio (FIG. 5G(i), ◆). At wavelengths slightly longer than the resonance, the polarization ellipse returns to a 45° tilt angle (FIG. 5G(i), ●) but maintains the same counter-clockwise direction. This 90° transition of the tilt angle over the resonance allows reflected light to transmit through the cross-polarizer, delivering signal from the grating. Also, it can be inferred from the sequence of polarization ellipse states within the resonance that the transmitted intensity will peak when the ellipse reaches an almost linearly-polarized state and remain low when it resembles a circularly-polarized state. More importantly, the bandwidth of the transmitted signal stays spectrally narrow, defined by the abruptness of the phase difference transition, satisfying one of the prerequisites for achieving high color vibrancy.

Figure 5H:
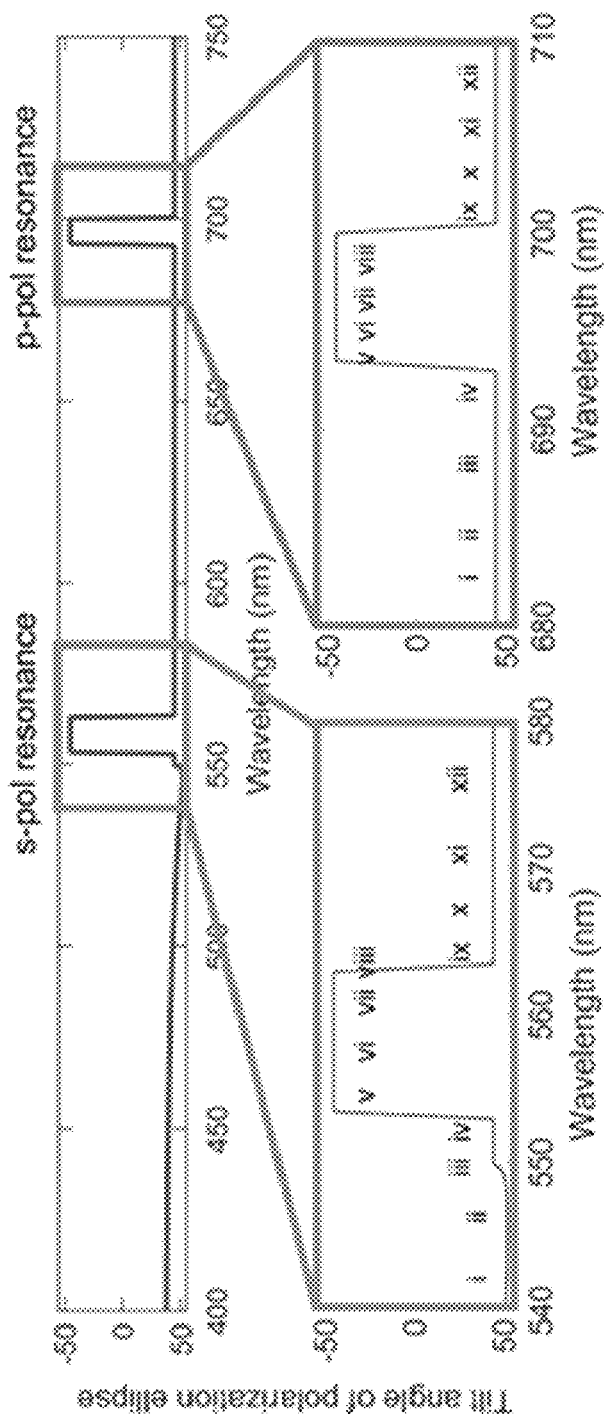
FIGS. 5H(i) to 5H(iii) show polarization ellipses at different rotational direction and tilt angles around resonance, according to an example of the present disclosure.

FIGS. 5H(i) to 5H(iii) indicate inclination angle of the polarization ellipse shape represented by the expanded number of polarization ellipsoid shapes in the s-pol and p-pol resonances. It shows that the polarization ellipse shape in rotation direction and tilt angle near the two resonances.

Vibrancy of the Dielectric Grating

To understand the high color vibrancy achieved with Pt as the metal substrate, we first illustrate the key concepts of the coupled waveguide-array formalism. While grating physics is well understood in the diffraction regime (period>wavelength) and the deep subwavelength regime (period<<wavelength), the rich phenomenon in the regime intermediate between these two has recently been understood in terms of waveguide-array modes or vertically propagating Bloch modes, which describe the same phenomenon. A waveguide array refers to an array of grating elements, which supports vertically propagating modes similar to that of a slab waveguide. In fact, the dispersion characteristics for a slab waveguide and waveguide-array are similar far from the cutoff frequency. Under normal incidence, the near-wavelength phenomenon can be determined by the interference and coupling of two even waveguide-array modes. We show that a phenomenon similar to the above can also be interpreted as guided mode resonances (GMR), which account for the excitation of guided modes horizontally traversing along the grating vector in an infinite and segmented grating, which it causes interference between leaked light and incident light. W. Yang et al. developed a simple analytical formalism that tracks the propagation of waveguide-array modes in a free-standing transmissive dielectric grating through one round trip, allowing one to accurately calculate the reflection and transmission. We build on this invention to understand birefringence from a near-wavelength grating on a reflective substrate.

Two important criteria that define high color vibrancy is the sharpness of the spectral peak, which defines the saturation, and the absence of other peaks in the spectrum, which determines the degree of spectral purity. To achieve the first condition, we exploit the interaction of light and a near-wavelength dielectric grating that exhibits moderate index contrast with the surrounding medium. A near-wavelength grating refers to a grating with period between the wavelength of the dielectric and that of its surrounding media. Ultra-sharp resonances in reflection and transmission have been reported in such dielectric gratings including high-contrast gratings, defined as high index gratings in low index media. To explain this effect, a simple but powerful analytical treatment of coupled waveguide-array modes was separately developed by P. Lalanne et al. and W. Yang et al. Originally derived for a transmissive dielectric grating, the waveguide-array mode formalism describes the excitation of two vertically propagating grating modes that couple with one another at the entrance and exit interfaces of the grating, leading to rich reflection and transmission phenomona. The formalism describes all the prominent features observed in a near-wavelength dielectric grating, including SPP excitation when the dielectric grating is resting on a metal, as we will see later. It has also been used to model high contrast gratings in vertical-cavity surface-emitting lasers (VCSELs), planar lens and reflectors, and hollow-core waveguides etc. Through a more simple modal description, dual waveguide-array modes have also been exploited to modulate diffraction efficiencies and control Talbot patterns for interference-based 3D nanopatterning. Modifying the original formalism by replacing the dielectric substrate with a reflecting one, we identify the two sharp s-pol and p-pol responses found in our system as resonances occurring from coupled waveguide-array modes reflecting between the grating-air and metal-grating interface.

The second criterion for achieving high color vibrancy demands high spectral purity. To satisfy this condition, we exploit optical loss in the metal rather than avoid it. Under our configuration, the color spectrally consists of both s-pol and p-pol responses, whose dual presence reduces the monochromaticity. The p-pol response is a plasmonic resonance characterized by a near-field localized at the metal interface whereas the s-pol response is characterized by a resonant field spatially separated from the metal interface. Therefore, if the metal interface is lossy, the p-pol response suffers strongly in intensity as the optical loss attenuates the plasmonic near-field. This leaves the sharp s-pol resonance alone to dominate the reflected spectrum, giving rise to a highly vibrant and spectrally pure color.

Accordingly, we show that with our reflective configuration, lossy Pt and W substrates result in wider sRGB color gamut coverages, indicative of higher color vibrancy, than that of Ag, which exhibits the least loss among metals. These results uncover a general strategy in reflective vibrant structural colors for substantially extending the range of metals beyond Ag and Al to lossy metals that host rich chemical and physical properties.

In the present disclosure, it is important to appreciate the distinct spatial profiles of the s-pol and p-pol resonances as they provide a strategy to enhance the spectral purity of color. The fact that the p-pol resonant field spatially overlaps with the metal-grating interface signifies that it is directly affected by losses from the metal. In contrast, the s-pol resonant field is spatially separated from the metal and is positioned between the air-grating interface. This suggests that the s-pol response is less sensitive to losses from the metal than the p-pol response.

FIGS. 4E(i) to 4E(iii) indicate cross-sectional view of resonant s-pol electric field distribution in grating with a 550 nm-period, 150 nm-etch width, and 200 nm-thickness on Ag, Pt and W substrates. FIGS. 4F(i) to 4F(iii) indicate cross-sectional view of resonant p-pol electric field distribution in grating with a 550 nm-period, 150 nm-etch width, and 200 nm-thickness on Ag, Pt and W substrates.

As shown in FIGS. 4E(i) to 4E(iii), the spatial characteristics of the s-pol resonant field among the three metals stays similar, although the intensity is found to gradually decrease for more lossy metals in the order of Ag, Pt and W.

On the other hand, FIGS. 4F(i) to 4F(iii) show a p-pol induced plasmonic near-field that is dramatically attenuated for Pt and more so for the W substrate compared to the case for a Ag substrate. Comparison of the s-pol and p-pol resonant field on different metals clearly demonstrates that loss affects the p-pol contribution more drastically than the s-pol contribution. Pt and W substrates support maximum s-pol resonant field intensities that are smaller than that from the Ag substrate by 17% and 27%, respectively, whereas their p-pol counterparts are smaller by 72% and 82%, respectively. This suggests that we can effectively remove the p-pol contribution by exploiting the loss while preserving the s-pol contribution.

Figure 6B:
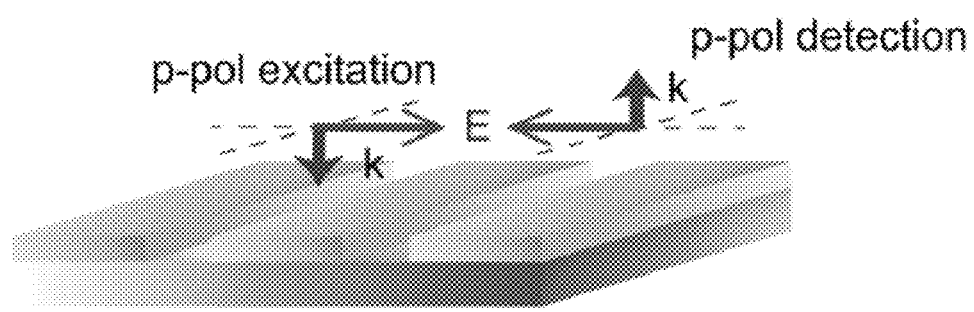
FIG. 6A and FIG. 6B show schematics of reflection measurements via s-pol and p-pol excitation/detection from dielectric gratings on a metal substrate, respectively, according to an example of the present disclosure.
Figure 6C:
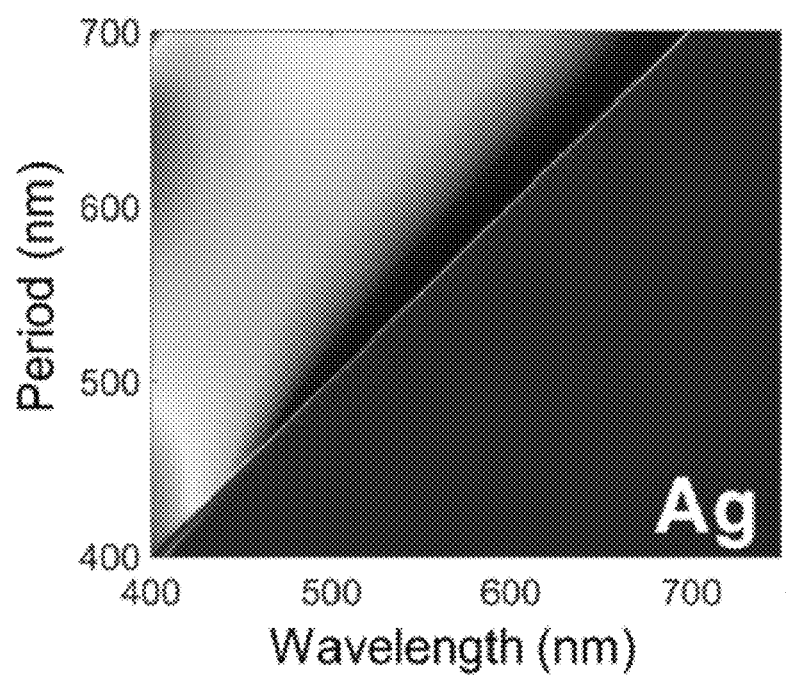
FIGS. 6C(i) to 6C(vi) and FIGS. 6D(i) to 6D(vi) show calculated and measured s-pol and p-pol reflection as a function of period and wavelength for dielectric gratings on Ag, Pt and W, respectively, according to an example of the present disclosure.
Figure 6C:
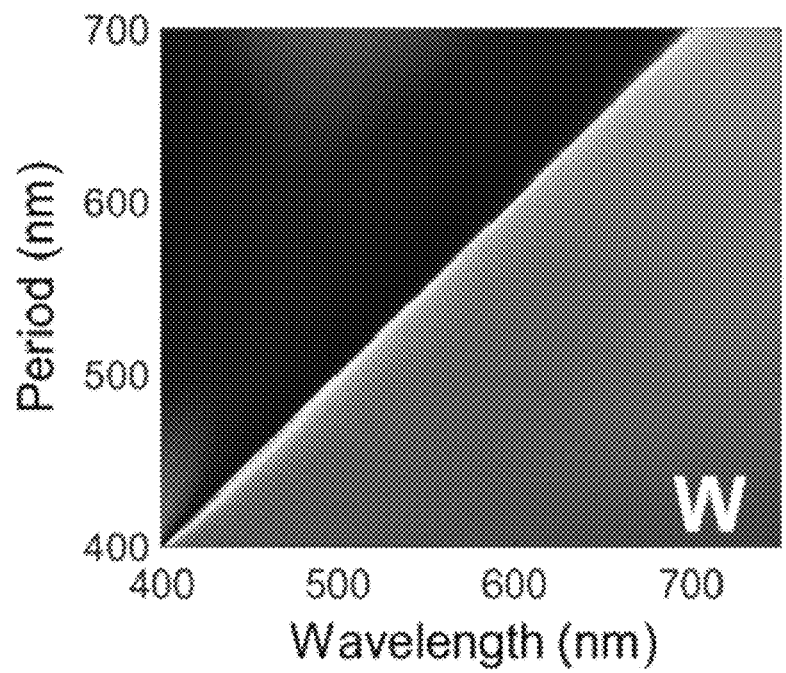
Figure 6C:
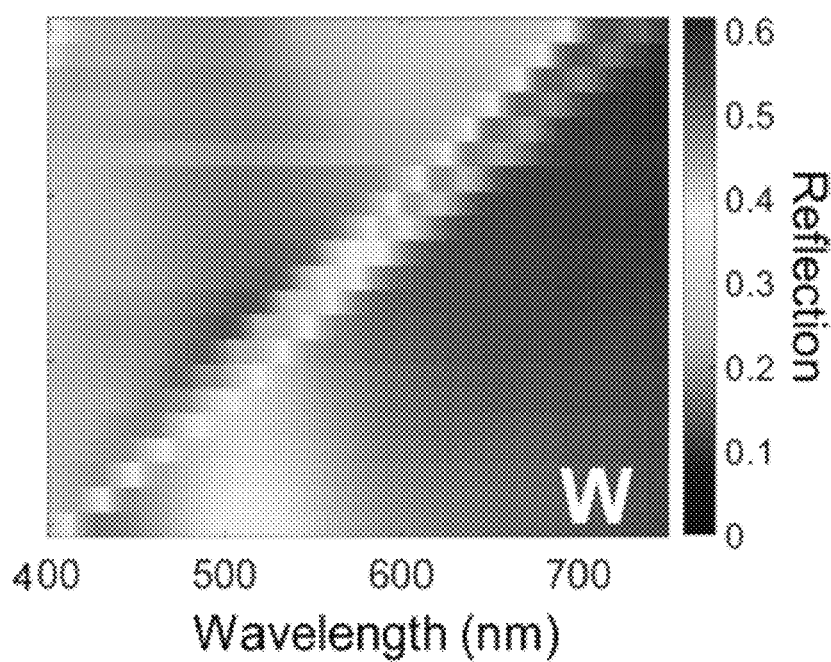
Figure 6D:
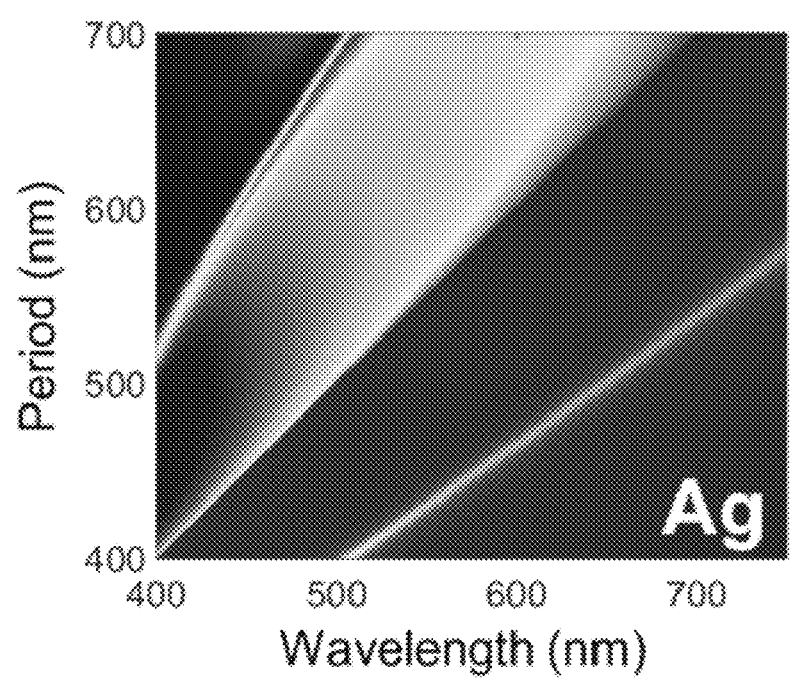
FIG. 6E shows the dependence of SPP propagation length on Ag, Pt and W, according to an example of the present disclosure.
Figure 6D:
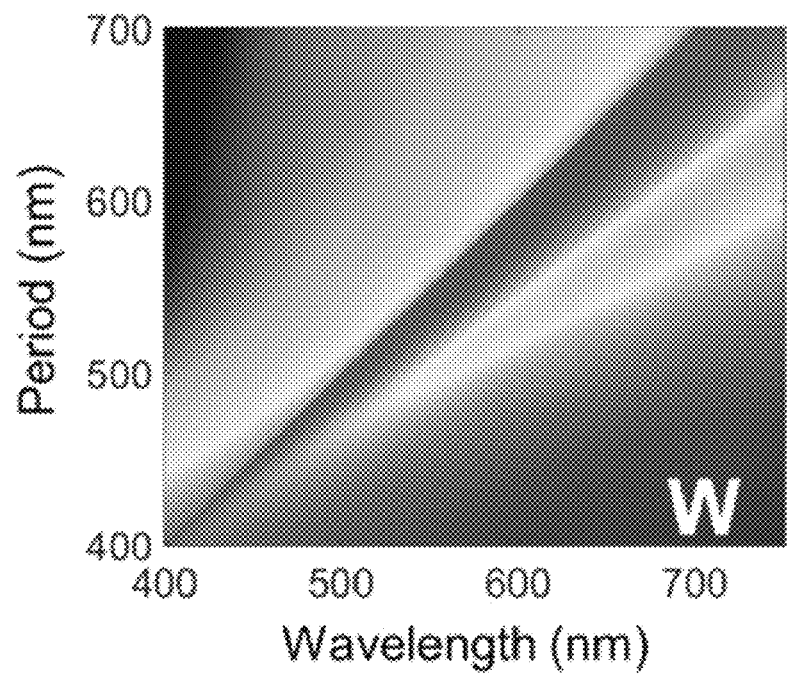
Figure 6D:
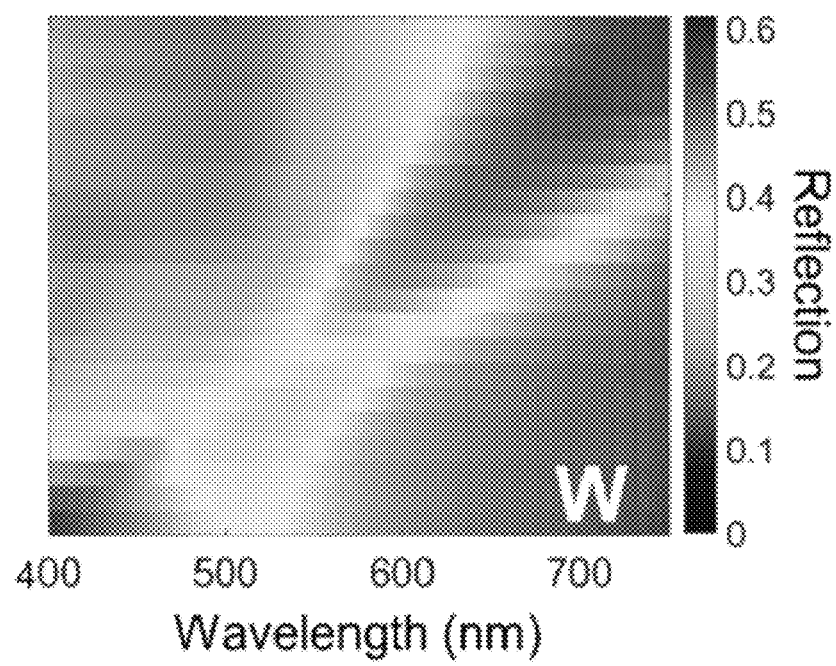
Figure 6E:
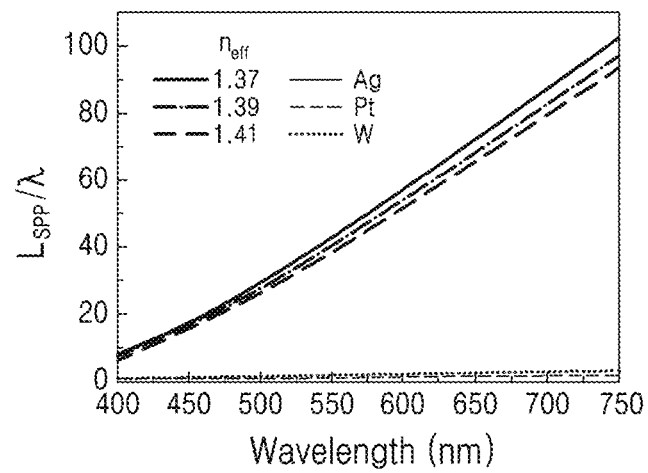

To experimentally confirm the generation of a grating supermode resonance from each polarized field component and evaluate its dependence on the metal substrate, we separately measured the $0^{th}$ order s-pol and p-pol reflection from etched PMMA gratings on Ag, Pt and W substrates as a function of wavelength and period as described in FIG. 6A, FIG. 6B, FIGS. 6C(i) to 6C(vi), FIGS. 6D(i) to 6D(vi), and FIG. 6E.

FIG. 6A indicates schematic of reflection measurements via s-pol excitation/detection from dielectric gratings on a metal substrate, showing the respective grating supermode and FIG. 6B indicates schematic of reflection measurements via p-pol excitation/detection from dielectric gratings on a metal substrate, showing the respective grating supermode.

The grating was aligned along and perpendicular to the incident polarization for s-pol and p-pol excitation-detection, respectively, as shown in the schematic of FIG. 6A and FIG. 6B. Pixels consisting of 50×50 μm$^2$ gratings with different grating periods and a fixed etch width were probed with a 0.15 N.A. objective lens. The PMMA thicknesses measured by AFM were 200 nm, 190 nm and 205 nm for pixels on Ag, Pt and W, respectively while the etch widths measured by SEM were 270 nm, 308 nm and 332 nm, respectively. For comparison purposes, RCWA calculations were performed using the measured grating parameters to obtain the $0^{th}$ order reflection. One can see that trends in the calculated s-pol and p-pol reflection for the three metals as a function of period and wavelength generally agree well with the measured results.

FIGS. 6C(i) to 6C(vi) show that calculated and measured s-pol reflection as a function of period and wavelength for dielectric gratings on Ag (FIGS. 6C(i) and 6C(ii)), Pt (FIGS. 6C(iii) and 6C(iv)) and W (FIGS. 6C(v) and 6C(vi)). FIGS. 6C(i) to 6C(vi) show that under s-pol excitation, reflection spectra from gratings on Ag, Pt and W behave similarly, characterized by high and low intensities for wavelengths longer or shorter than the period, respectively. Because the map describes the $0^{th}$ order reflection intensity, the absence of the $1^{st}$ order diffraction intensities for wavelengths less than the period accounts for the abrupt change between the two disparate reflection regimes. The PMMA thickness also influences the $0^{th}$ order reflection intensity for wavelengths less than the period due to wave interference effects, as seen most noticeably with the Ag case. One can notice a small dip in measured reflection intensity, that is absent in the calculation, for wavelengths near the period for all three metal substrates. This dip arises from the use of an objective lens to illuminate light onto the grating pixel. Light delivered onto the pixel through an objective lens carries a finite angular distribution, which has the effect of splitting the resonances in the grating, as we confirm in FIG. 6E, FIGS. 8A(i) to 8A(iii) and FIGS. 8B(i) to 8B(iii). The effect is not observable in the calculations because a plane wave source is used for illumination.

Figure 7A:
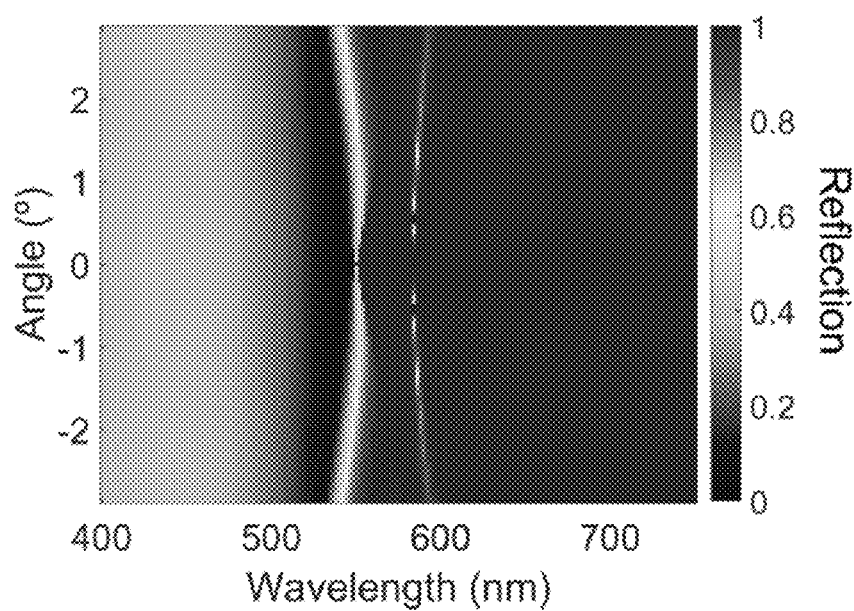
FIGS. 7A(i) to 7A(iii) and FIGS. 7B(i) to 7B(iii) show calculated s-pol and p-pol $0^{th}$ order reflection from PMMA grating on Ag, Pt and W substrates as a function of wavelength and incident angle, respectively, according to an example of the present disclosure.
Figure 7A:
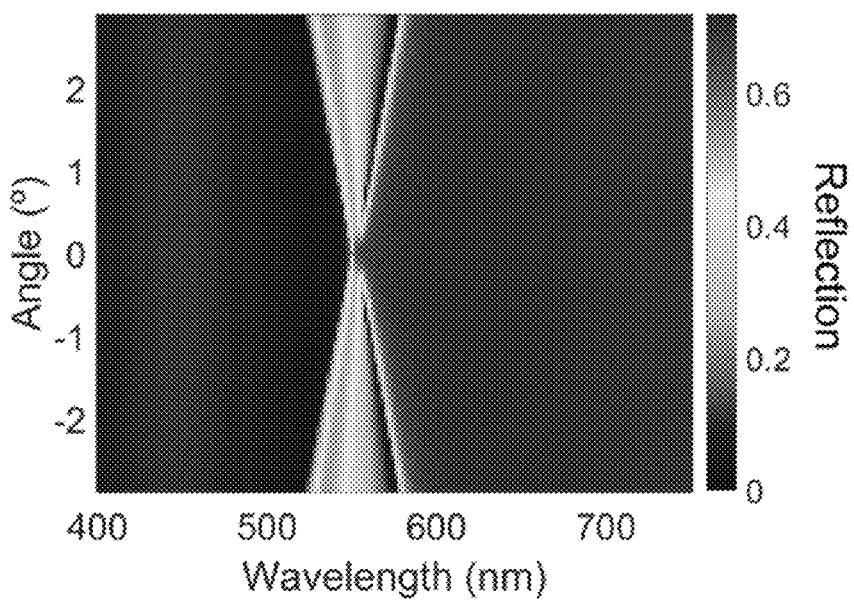

FIGS. 7A(i) to 7A(i) and FIGS. 7B(i) to 7B(i) indicate calculated s-pol (FIGS. 7A(i) to 7A(iii)) and p-pol (FIGS. 7B(i) to 7B(iii)) $0^{th}$ order reflection from PMMA grating on Ag (FIG. 7A(i) and FIG. 7B(i)), Pt (FIG. 7A(ii) and FIG. 7B(i) and W (FIG. 7A(iii) and FIG. 7B(iii)) substrates as a function of wavelength and incident angle. The grating parameters are identical to those used in FIG. 6A, FIG. 6B, FIGS. 6C(i) to 6C(vi), FIGS. 6D(i) to 6D(vi), and FIG. 6E.

Figure 8A:
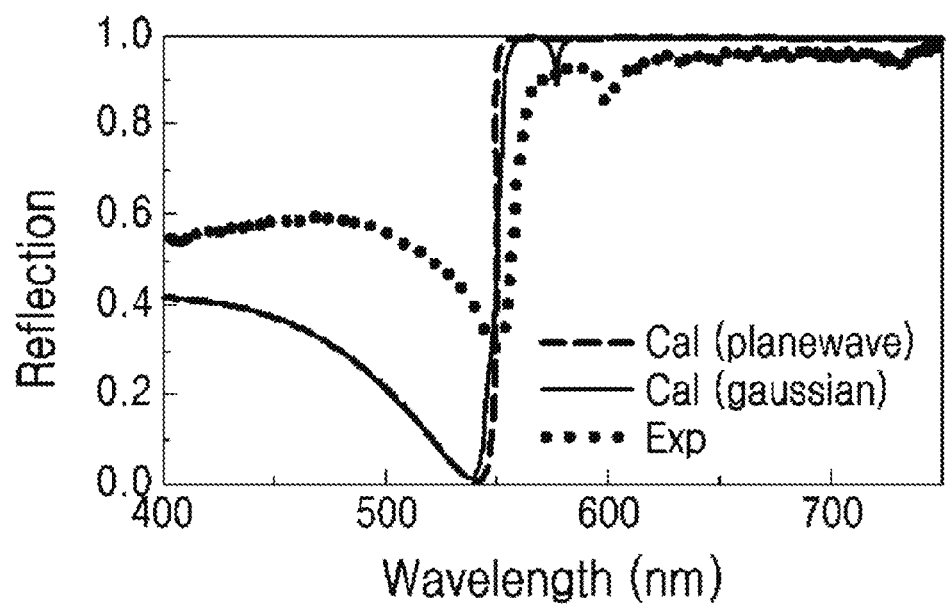
FIGS. 8A(i) to 8A(iii) and FIGS. 8B(i) to 8B(iii) show comparison of s-pol and p-pol $0^{th}$ order reflection between measurement, and calculation using a planewave source and Gaussian beam for Ag, Pt, and W substrates, respectively, according to an example of the present disclosure.
Figure 8A:
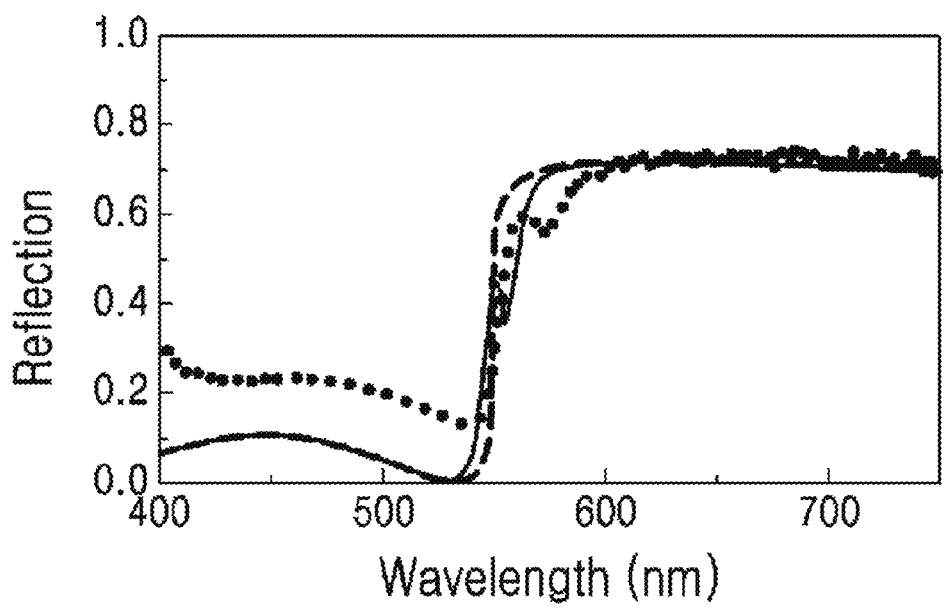

FIGS. 8A(i) to 8A(iii) and FIGS. 8B(i) to 8B(iii) indicate comparison of s-pol (FIGS. 8A(i) to 8A(iii)) and p-pol (FIGS. 8B(i) to 8B(iii)) $0^{th}$ order reflection between measurement, and calculation using a planewave source and Gaussian beam for Ag (FIG. 8A(i) and FIG. 8B(i)), Pt (FIG. 8A(ii) and FIG. 8B(i), and W (FIG. 8A(iii) and FIG. 8B(iii)) substrates. Reflection from a planewave source corresponds to the spectrum at the 0° angle in FIGS. 7A(i) to 7A(iii) and FIGS. 7B(i) to 7B(iii), while reflection from a Gaussian beam corresponds to the product between the angular Gaussian distribution of incident light and the incident angle dependent reflection integrated over the angles. Grating parameters are identical to those used in FIG. 6A, FIG. 6B, FIGS. 6C(i) to 6C(vi), FIGS. 6D(i) to 6D(vi), and FIG. 6E.

FIGS. 6D(i) to 6D(vi) indicate calculated and measured p-pol reflection as a function of period and wavelength for dielectric gratings on Ag (FIGS. 6D(i) to 6D(ii)), Pt (FIGS. 6D(ii) to 6D(iii)) and W (FIGS. 6D(v) to 6D(vi)). FIG. 6E indicates the normalized SPP propagation length by wavelength measured for smooth Ag (-) films, Pt (--) films, and W ( . . . ) films supporting dielectrics of different effective refractive indices.

We examine the behavior of the p-pol grating supermode resonance for Ag, Pt and W substrates as shown in FIGS. 6D(i) to 6D(vi). Similar to the s-pol reflection, high reflection is observed in the $0^{th}$ order diffraction regime, which decreases in the order of metals with increasing loss. More importantly, we observe a SPP mode occurring at wavelengths larger than the period for all three cases. However, distinct differences in its behavior are apparent among the three metal substrates. First, the spectral width of the SPP resonance increases for metals with higher losses, as observed in calculation and measurement. The SPP resonance width is narrowest for Ag and widest for W. Second, the reduction in reflection intensity at the SPP resonance is smallest for Ag, shown more clearly in the calculation and the largest W. These reduced values indicate larger dissipation of power by the SPP on W than on Ag as it experiences larger losses at the metal-grating interface.

The overall interrelationship between the dissipation and grating parameters of SPP in lossy metals can be established by examining the imaginary component of the SPP wavevector. For the first approximation, the SPP dissipation of a flat and uniform metal-dielectric interface can be used to model the SPP wave vector of the dielectric grating on a metal substrate. This approximation was also used to understand the role of SPPs in the significant transmission of light through an array of holes drilled through a metal slab. For SPPs on a flat metal-dielectric interface, a dielectric film with a larger index increases the imaginary component of the SPP wavevector, meaning increased dissipation. In the system of the present invention, the etch width is fixed, so that a larger period corresponds to an increased effective refractive index for the subwavelength grating. This enhances the dissipation of SPPs on the lossy metal interface during a larger grating period, as shown for the Pt and W substrates in FIGS. 4D(i) to 4D(iii). For Ag substrates, the dissipation of the SPP does not increase for larger periods because the increase in the propagation length of the SPP (i.e., the larger effective refractive index) over the wavelength range of interest is greater than the dissipation due to the larger period (FIG. 6E).

Supermode Resonance of the Dielectric Grating

By comparing the s-pol reflection among Ag, Pt and W substrates, one can find that the $0^{th}$ order reflection is highest for Ag and lowest for W, as expected from the order of inherent reflectivities of the metals. For all three metals, the s-pol grating supermode resonance coincides with the onset of the $1^{st}$ order diffraction (i.e., wavelength equals period), and is seen to be abrupt from both calculated and experimental reflection maps. Since it is the abrupt phase difference accompanying the supermode resonance that keeps the spectral width of the cross-polarized reflection peak narrow, rather than differences in the absolute reflection intensities, we expect all three metal substrates to display similar and high color vibrancies from the s-pol response.

To apply the above observations to the production of vibrant colors, we measured the cross-polarized reflection from PMMA gratings on Ag, Pt and W substrates, subjected to incident light polarized 45° relative to the grating, and evaluated their sRGB color gamut coverage. We investigated gratings with the same or similar parameters as those investigated in the s-pol and p-pol excitation-detection measurements, as described above. The PMMA thickness (and etch width) for the Ag, Pt, and W substrates were 200 (270) nm, 190 (308) nm, and 193 (346) nm, respectively. For comparison, we calculated the cross-polarized reflection through FDTD simulations modelling the grating on the three metals.

Figure 9A:
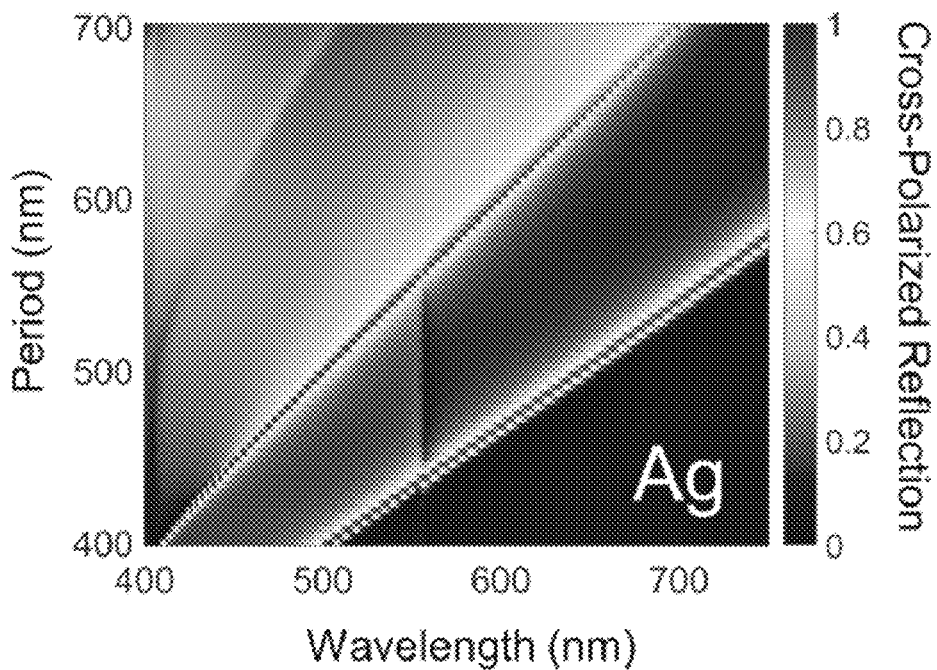
FIGS. 9A(i) to 9A(iii) show calculated cross-polarized reflection as a function of period and wavelength from dielectric gratings on Ag, Pt and W substrates, respectively, according to an example of the present disclosure.
Figure 9A:
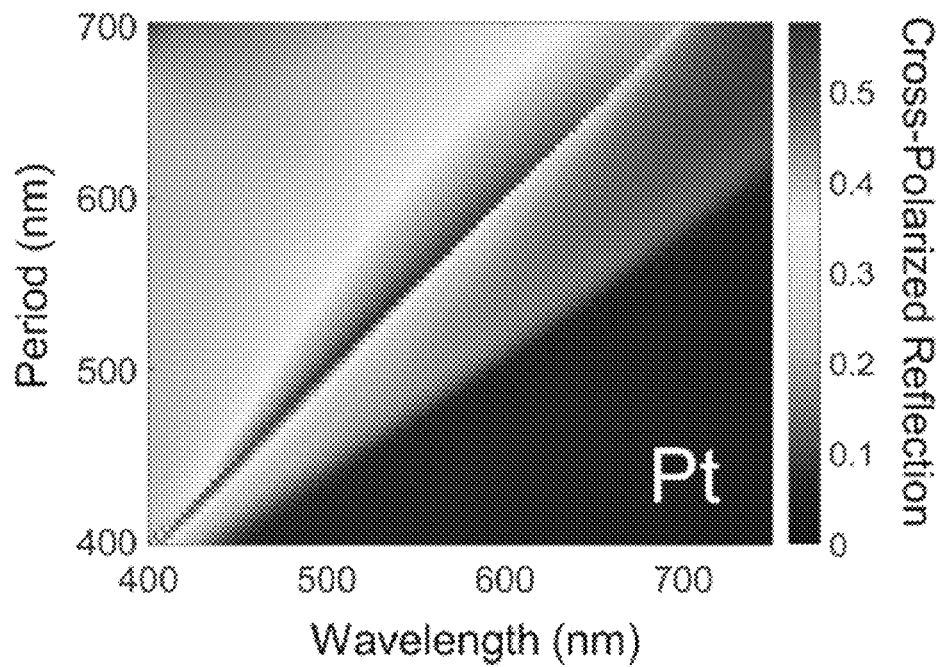
Figure 9B:
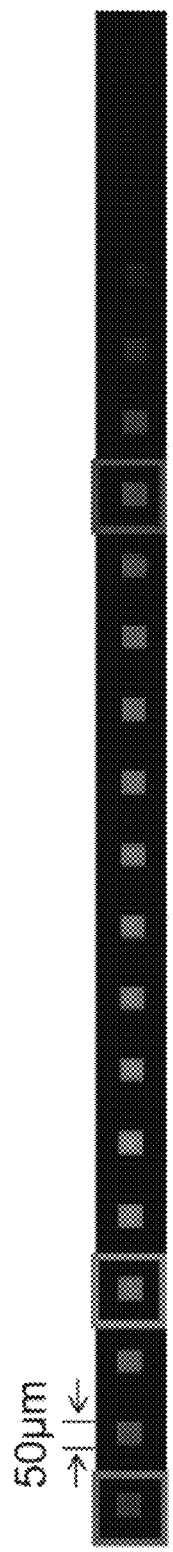
FIGS. 9B(i), 9B(iv) and 9B(vii) show Optical images of 50×50 µm² pixels.
Figure 9B:
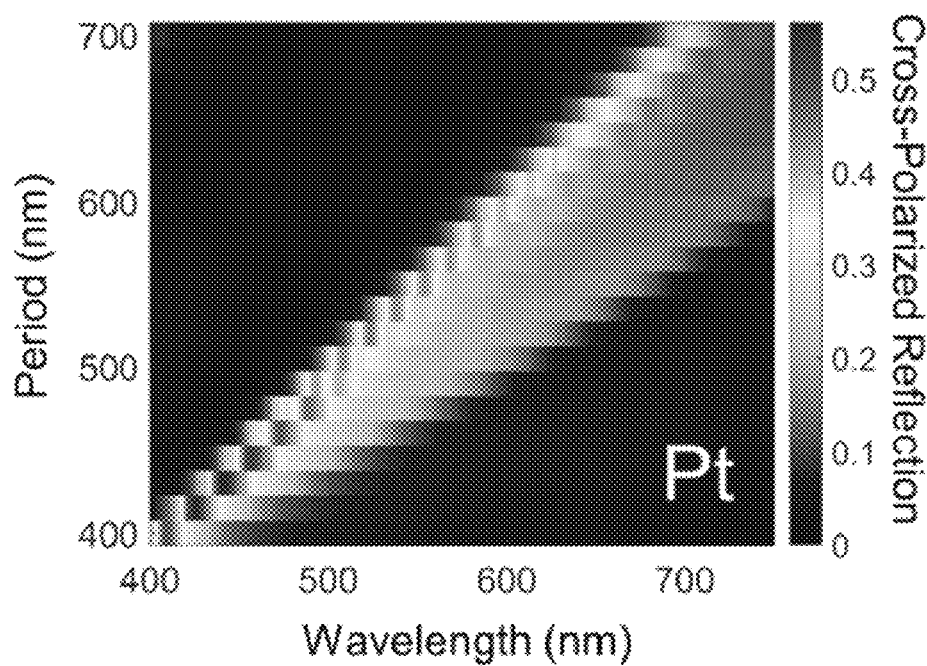
Figure 9B:
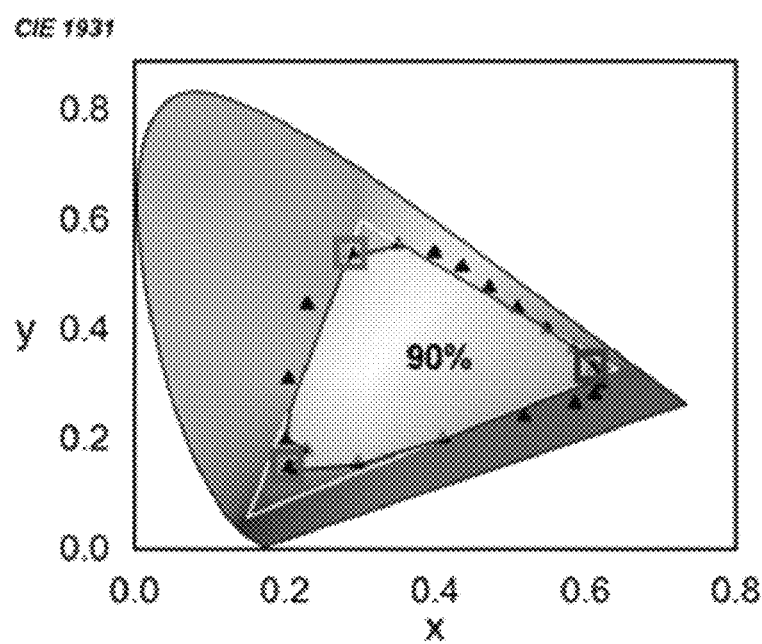

FIGS. 9A(i) to 9A(iii) and FIGS. 9B(i) to 9B(ix) show the calculated and measured cross-polarized reflection, respectively, as a function of period and wavelength. Specifically, FIGS. 9A(i) to 9A(iii) indicate calculated cross-polarized reflection as a function of period and wavelength from dielectric gratings on Ag (FIG. 9A(i)), Pt (FIG. 9A(ii)) and W (FIG. 9A(iii)) substrates. FIGS. 9B(ii), 9B(v) and 9B(viii) indicate measured cross-polarized reflection, and FIGS. 9B(i), 9B(vi) and 9B(ix) indicate CIE chromaticity diagram indicating the measured chromaticities and sRGB coverage ratio. FIGS. 9B(i), 9B(iv) and 9B(vii) indicate optical images of 50×50 µm$^2$ pixels.

Similar to our theoretical analysis of dielectric gratings on a PEC (FIG. 4A), PMMA gratings on a Ag substrate show sharp s-pol and p-pol resonances contributing to the cross-polarized reflection in calculation and measurement. However, for the Pt and W substrates, the p-pol resonance is barely observable because the loss from the metal dissipates the field. This has the effect of reducing the number of distinct spectral peaks in the cross-polarized reflection spectrum from two to one, increasing the monochromaticity of the generated color. Because the position of the s-pol resonance equals the period across the entire visible range, passive color control is intuitive (i.e., the grating period is the wavelength of colored light). We note that the extra resonance arising near the original s-pol response for the three metal substrates, shown in the measured reflection map results from the finite angular distribution of light introduced by the low N.A. objective lens as described before (See FIGS. 7A(i) to 7A(iii), FIGS. 7B(i) to 7B(iii), FIGS. 8A(i) to 8A(iii), and FIGS. 8B(i) to 8B(iii)).

The enhanced spectral purity and associated color vibrancy from the three metal substrates are demonstrated in the OM images of the pixel sets and corresponding CIE diagrams, as shown in FIGS. 9B(i) to 9B(ix). From the OM images, one can see that the accessible range of colors for pixels on a Ag substrate is limited compared to that with a Pt or W substrate. For example, the Ag substrate does not support a vivid yellow color whereas the Pt and W substrate do. We calculate the sRGB gamut coverage, which is an indicator of color range and color vibrancy, by obtaining the ratio between the area defined by the measured chromaticities from each pixel and that of the sRGB triangle. In accordance with other studies, areas outside the sRGB triangle are truncated such that the gamut coverage is less or equal to unity. We find that despite the high reflectivity and low loss exhibited by Ag, the measured gamut coverage with a Ag substrate is only 55%, which is significantly smaller than the 90% coverage achieved with Pt and smaller than the 69% coverage achieved with W. The low gamut coverage for Ag is attributed to the strong contribution of the p-pol response, which compromises the monochromaticity by adding a spectrally distinct peak to the s-pol response in the cross-polarized reflection spectrum. In contrast, the high losses exhibited by Pt and W help diminish the contribution of the p-pol response, allowing the spectrally sharp s-pol response alone to define the color. Such a strategy helps to improve the color vibrancy significantly by expanding the gamut coverage. The measured value of 90% from Pt is one of the highest among reported reflective color filters including those from plasmonic and Mie resonance type designs for coverage areas restricted to within the sRGB triangle. While the scheme is general to other lossy metals, it is worth noting that the use of Pt ensures prolonged optical stability as the surface is largely immune to oxidation, and the use of W enables enhanced thermal stability as it exhibits one of the lowest thermal expansion coefficients.

Contrast of the Dielectric Grating

We also note that high contrast between pixel and background can be achieved through our cross-polarized input/output light scheme. The contrast ratio for each pixel can be obtained by calculating the ratio between its integrated spectrum and that of the background. By reducing the background signal to near zero, a high contrast ratio can be obtained. In our case, the trace intensity in the background signal depends on the extinction ratios of the input and output polarizers, and can be further minimized by using polarizers with higher extinction ratios. Our measurements were performed with polarizers exhibiting a 100:1 extinction ratio, resulting in an average contrast ratio of 48:1, 58:1 and 31:1 for the Ag, Pt and W based pixels, respectively. These values show that comparable contrast ratios can be achieved with different metal substrates despite differences in the optical loss.

Analytical Description of the Reflection

Our analytical description of reflection from a 1D dielectric grating on a metal substrate using coupled waveguide-array modes is derived from the work of W. Yang et al. W. Yang provides a detailed description of the analytical treatment of coupled waveguide-array modes in a free-standing grating system, where the top, middle and bottom layers are air, grating and air, respectively. The description of the present invention modifies the original system by replacing the transmissive bottom dielectric layer with a reflective PEC layer.

FIG. 10 indicates schematic of mode propagation in air-grating-PEC system.

We consider a system consisting of an air (layer I), dielectric grating (layer II) and PEC (layer III) layer, as shown in FIG. 10. Analogous to the work of W. Yang, we can expand the fields in the air and dielectric grating layers according to their modal basis set as follows:

$$E_x^I(x,z) = \sum_{n=-\infty}^{+\infty} [A_n^I(z) + B_n^I(z)]e_{x,n}^I(x) \quad (1)$$

$$E_x^{II}(x,z) = \sum_{m=0}^{\infty} [A_m^{II}(z) + B_m^{II}(z)]e_{x,m}^{II}(x)$$

Here, the coefficients characterize the complex diffraction and waveguide-array modes in the air and grating layers, respectively, propagating in the forward(A) and backward (B) directions. The forward moving modes can be expressed as follows:

$$A^I = [\ldots A_{-2}{}^I A_{-1}{}^I A_0{}^I A_1{}^I A_2{}^I \ldots]^T$$

$$A^{II} = [A_0{}^{II} A_1{}^{II} A_2{}^{II} \ldots]^T \quad (2)$$

The backward-moving modes can also be expressed analogously. $\rho_{21}$ and $\rho_{12}$ are reflection matrices describing the reflection of modes from layer 2 to 1 and 1 to 2, respectively. $\rho_{21}$, in particular, describes the coupling of waveguide-array modes into one another. Similarly, $\tau_{12}$ and $\tau_{21}$ are transmission matrices for modes transmitting from layer 1 to 2 and 2 to 1, respectively. $\rho_{23}$ describes the waveguide-array modes reflecting off the PEC layer ($\rho_{23}=-1$) in which case all modes reflect onto themselves (i.e., no cross-coupling among modes occurs). The objective of present invention is to find an expression for the $0^{th}$ order reflection, which can be obtained by finding:

$$R = B_I \cdot A_I^{-1} \quad (3)$$

We can first construct a matching matrix that relates the fields at the interface between air and grating:

$$\begin{pmatrix} A_I(z=0^-) \\ B_I(z=0^-) \end{pmatrix} = \begin{pmatrix} t_{12}^{-1} & -t_{12}^{-1}\rho_{21} \\ \rho_{12}t_{12}^{-1} & -\rho_{12}t_{12}^{-1}\rho_{21} + t_{21} \end{pmatrix} \begin{pmatrix} A_{II}(z=0^+) \\ B_{II}(z=0^+) \end{pmatrix} \quad (4)$$

We define a propagation matrix that tracks the accumulated phase of the modes as they propagate through the grating thickness:

$$\Psi = \begin{pmatrix} e^{-i\beta_0 h} & 0 & 0 \\ 0 & e^{-i\beta_1 h} & 0 \\ 0 & 0 & e^{-i\beta_2 h} \end{pmatrix} \quad (5)$$

The modes at the top grating interface can then be related to the bottom interface as follows:

$$\begin{pmatrix} A_{II}(z=0^+) \\ B_{II}(z=0^+) \end{pmatrix} = \begin{pmatrix} \psi^{-1} & 0 \\ 0 & \psi \end{pmatrix} \begin{pmatrix} A_{II}(z=h^{-1}) \\ B_{II}(z=h^{-1}) \end{pmatrix} \quad (6)$$

The diffraction modes in the air layer can then be expressed as follows:

$$\begin{pmatrix} A_I(z=0^-) \\ B_I(z=0^-) \end{pmatrix} = \begin{pmatrix} t_{12}^{-1} & -t_{12}^{-1}\rho_{21} \\ \rho_{12}t_{12}^{-1} & -\rho_{12}t_{12}^{-1}\rho_{21} + t_{21} \end{pmatrix} \begin{pmatrix} \psi^{-1} & 0 \\ 0 & \psi \end{pmatrix} \begin{pmatrix} A_{II}(z=h^-) \\ B_{II}(z=h^-) \end{pmatrix} \quad (7)$$

Since $B_{II}$ are $A_{II}$ modes reflecting from a PEC layer, they can be expressed as $$B_{II}(z=h^-)=\rho_{23}A_{II}(z=h^-)=-A_{II}(z=h^-) \quad (8)$$

Using equation (3), (7) and (8), we can find an expression for the reflection as follows:

$$R=(\rho_{12}t_{12}^{-1}\psi^{-1}+\rho_{12}t_{12}^{-1}\rho_{21}\psi-t_{21}\psi)(t_{12}^{-1}\psi^{-1}+t_{12}^{-1}\rho_{21}\psi)^{-1} \quad (9)$$

from which we find $R_{00}$. Expressions for $\rho_{12}$, $\rho_{21}$, $t_{12}$ and $t_{21}$ can be found from below $$\rho_{21}=(H+E)^{-1}(H-E)$$

$$\rho_{12}=-H(H+E)^{-1}(H-E)H^{-1}$$

$$t_{21}=2H(H+E)^{-1}E$$

$$t_{12}=2H(H+E)^{-1} \quad (10)$$

where H and E correspond to the overlap of fields in air and grating, expressed as, $$H_{n,m}=\frac{\int_0^\Lambda H_{y,m}^{II}(x)[H_{y,n}^{I}(x)]^* dx}{\int_0^\Lambda |H_{y,n}^{I}(x)|^2 dx} \quad (11)$$

$$E_{n,m}=\frac{\int_0^\Lambda \varepsilon_{x,m}^{II}(x)[\varepsilon_{x,n}^{I}(x)]^* dx}{\int_0^\Lambda |\varepsilon_{x,n}^{I}(x)|^2 dx}$$

Figure 11A:
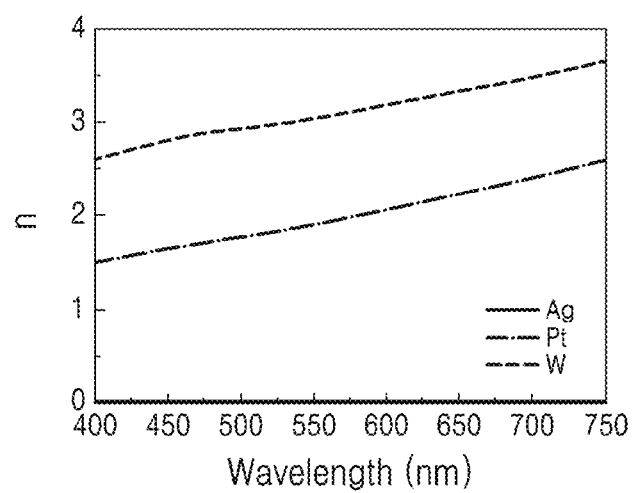
FIGS. 11A(i) to 11A(ii) and refractive indices of Ag, Pt and W measured by ellipsometry, respectively, according to an example of the present disclosure.

FIGS. 11A(i) to 11A(ii) indicate the refractive index measured by ellipsometer, and FIGS. 11B(i) to 11B(ii) indicate the real part of permittivity and the imaginary part of permittivity measured by ellipsometer.

As shown in FIGS. 11A(i) to 11A(ii) and FIGS. 11B(i) to 11B(ii), it can be seen that the tilt angle means a fast transition through a series of elliptically polarized states (FIG. 5F and FIGS. 5G(i) to 5G(ii)).

As shown in FIG. 11A(i) to FIG. 11B(ii), it can be seen that the tilt angle means a fast transition through a series of elliptically polarized states (see FIGS. 5F and 5G).

We can confirm this effect by visualizing the s-pol and p-pol resonant fields for Ag, Pt and W via FDTD simulations using tabulated optical constants for Ag, and measured optical constants via ellipsometry for Pt and W (FIGS. 11A(i) to 11A(ii) and FIGS. 11B(i) to 11B(ii)).

The grating period, etch width, thickness, and refractive index were fixed to 550 nm, 300 nm, 200 nm, and 1.5, respectively.

Conclusionally, in the present disclosure, we demonstrate such a strategy with highly vibrant reflective color pixels composed of 1D dielectric gratings on a lossy metal substrate, analyzed under a cross-polarized configuration for input and output light. Each pixel, oriented 45° relative to the input polarization, reflects colored light whose spectral purity can improve for lossy metals. Due to its orientation, the pixel receives two orthogonal components of incident light defined with respect to the grating: the s-polarized (s-pol) and p-polarized (p-pol) field. Also known as the transverse electric field (TE field) and the transverse magnetic field (TM field), respectively, wherein the TE field corresponds to an electric field oriented perpendicularly (parallel) to the grating vector. For a specific grating period, each field component generates a spectrally distinct resonance, wherein the p-pol resonance can be identified as an SPP. Each resonance induces an abrupt phase shift, resulting in a phase difference between s-pol and p-pol reflected fields (i.e., birefringence) that rotates the incident polarization as a function of wavelength. Since the output polarizer is cross-polarized, only reflected light whose polarization is rotated by $\pm\pi/2$ is transmitted through, giving rise to a signal at the s-pol and p-pol resonances with a sharpness defined by the spectral width of the phase difference transition.

In summary, despite their distinctive chemical properties, lossy metals are generally avoided in the design of structural colors because the optical losses can degrade the color vibrancy. In the present disclosure, we demonstrate a strategy that allows lossy metals supporting near-wavelength dielectric gratings to achieve high color vibrancy by benefiting from the optical loss rather than suffering from it. By exciting the grating rotated 45° relative to the incident field, s-polarized (s-pol) and p-polarized (p-pol) light each excites a spectrally distinct resonance, described by an analytical treatment of coupled waveguide-array modes. Owing to the birefringence, a cross-polarized reflection spectrum displays two sharp peaks from each component that decreases the monochromaticity. We show that lossy metals can minimize the p-pol contribution, leaving the sharp s-pol response to determine the spectrum and generate high color vibrancy. Through this scheme, we demonstrate that lossy metal substrates including Pt, catalytically active metal and W, CMOS compatible metal can achieve larger sRGB gamut coverage ratios of 90% and 69%, respectively, than that of 55% from Ag, while maintaining similar pixel contrast ratios.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A reflective color pixel, comprising:
    a dielectric grating formed on a lossy metal substrate;
    an air layer;
    a grating layer; and
    a reflective layer,
        wherein the reflective layer includes the lossy metal substrate,
        wherein the grating layer includes the dielectric grating, and
        wherein the lossy metal substrate has an optically-opaque thicknesses,
        wherein the lossy metal includes Cu, Ni, Co, Pd, Pt, or W,
        wherein the pixel reflects colored light whose spectral purity can improve for the lossy metal with respect to an input polarizer incident to the pixel in a 45° direction,
        wherein the pixel receives an s-polarized field and a p-polarized field, which are two orthogonal components of incident polarization passing through the input polarizer defined with respect to the dielectric grating, and the pixel transmits only reflected light rotated by an angle of $\pm\pi/2$ when an output polarizer is cross-polarized.

2. The reflective color pixel of claim 1, wherein the dielectric grating is a one-dimensional dielectric grating.

3. The reflective color pixel of claim 1, wherein a period of the dielectric grating corresponds to a wavelength of colored light implemented by the reflective color pixel.

4. The reflective color pixel of claim 3, wherein the period of the dielectric grating is from 300 nm to 900 nm, an etch width of the dielectric grating is from 130 nm to 490 nm, and the ranges of the period and the etch width of the dielectric grating satisfy a correlation in which a duty cycle defined by the expression [(the period of the dielectric grating−the etch width of the dielectric grating)/the period of the dielectric grating] is from 0 to 1.

5. The reflective color pixel of claim 1, wherein the p-polarized field is located at an interface between a metal layer and a grating layer, and the s-polarized field is located at an interface between an air layer and the grating layer.

6. The reflective color pixel of claim 1, wherein the reflective color pixel has a multifunctional filter function, a catalytic function, CMOS compatibility, or improved thermal stability.

* * * * *